(12) United States Patent
Yamaguchi et al.

(10) Patent No.: US 8,613,873 B2
(45) Date of Patent: Dec. 24, 2013

(54) ANODE, BATTERY, AND METHODS OF MANUFACTURING THEM

(75) Inventors: Hiroyuki Yamaguchi, Fukushima (JP); Masayuki Ihara, Fukushima (JP); Hideki Nakai, Fukushima (JP); Atsumichi Kawashima, Fukushima (JP); Tadahiko Kubota, Kanagawa (JP)

(73) Assignee: Sony Corporation, Tokyo (JP)

( * ) Notice: Subject to any disclaimer, the term of this patent is extended or adjusted under 35 U.S.C. 154(b) by 1142 days.

(21) Appl. No.: 12/274,940

(22) Filed: Nov. 20, 2008

(65) Prior Publication Data

US 2009/0136855 A1 May 28, 2009

(30) Foreign Application Priority Data

Nov. 28, 2007 (JP) .................................. 2007-307436

(51) Int. Cl.
H01B 1/16 (2006.01)
H01M 6/16 (2006.01)

(52) U.S. Cl.
USPC ............... 252/519.34; 252/519.4; 252/519.2; 429/343; 427/126.1; 427/212

(58) Field of Classification Search
USPC ............ 252/519.34, 519.4, 519.2; 429/343; 427/126.1, 212
See application file for complete search history.

(56) References Cited

U.S. PATENT DOCUMENTS

| | | | | |
|---|---|---|---|---|
| 3,062,907 A * | 11/1962 | Macht et al. | ......... | 585/846 |
| 5,919,589 A * | 7/1999 | Kawakami et al. | ........ | 429/231.8 |
| 6,110,442 A * | 8/2000 | Xia et al. | .............. | 423/599 |
| 6,165,642 A * | 12/2000 | Kawakami et al. | ........ | 429/218.1 |
| 6,432,585 B1 * | 8/2002 | Kawakami et al. | .......... | 429/233 |
| 6,617,078 B1 * | 9/2003 | Chia et al. | ............... | 429/316 |
| 6,638,322 B1 * | 10/2003 | Kawakami et al. | .......... | 29/623.1 |
| 6,835,332 B2 * | 12/2004 | Yamamoto et al. | ........ | 252/519.1 |
| 6,902,845 B2 * | 6/2005 | Tani et al. | ................ | 429/218.2 |
| 7,141,187 B2 * | 11/2006 | Kosuzu et al. | ............ | 252/521.3 |
| 8,133,616 B2 * | 3/2012 | Exnar et al. | .................... | 429/224 |
| 2002/0015889 A1 * | 2/2002 | Yamamoto et al. | ...... | 429/231.95 |
| 2004/0018432 A1 * | 1/2004 | Adachi et al. | ................. | 429/343 |
| 2006/0019170 A1 * | 1/2006 | Adachi et al. | ................. | 429/341 |
| 2007/0117024 A1 * | 5/2007 | Nakai et al. | ................... | 429/246 |
| 2007/0231604 A1 * | 10/2007 | Ohkubo et al. | .............. | 428/704 |
| 2009/0226821 A1 * | 9/2009 | Ihara et al. | .................... | 429/338 |
| 2011/0068002 A1 * | 3/2011 | Lin et al. | ...................... | 204/296 |
| 2011/0250509 A1 * | 10/2011 | Yamaguchi et al. | .......... | 429/339 |

FOREIGN PATENT DOCUMENTS

| | | |
|---|---|---|
| JP | HEI 07-065863 | 3/1995 |
| JP | 08-138745 | 5/1996 |
| JP | 2000-268863 | 9/2000 |
| JP | 2002-056891 | 2/2002 |
| JP | 2003-092137 | 3/2003 |
| JP | 2004-095445 | 3/2004 |
| JP | 2004-171874 | 6/2004 |
| JP | 2006032300 A * | 2/2006 |
| WO | 2007046327 A1 | 4/2007 |

OTHER PUBLICATIONS

English Translation of JP 2006032300 A, Feb. 2006.*
Japanese Office Action dated Dec. 18, 2012 issued in connection with counterpart Japanese Patent Application No. 2007-307436.

* cited by examiner

Primary Examiner — Douglas Mc Ginty
(74) Attorney, Agent, or Firm — Dentons US LLP

(57) ABSTRACT

A battery capable of improving the cycle characteristics and the swollenness characteristics is provided. The battery includes a cathode, an anode, and an electrolytic solution. The electrolytic solution is impregnated in a separator provided between the cathode and the anode. The anode has a coat on an anode active material layer provided on an anode current collector. The coat contains a metal salt. The metal salt has a hydroxyl group and at least one of a sulfonic acid group and a carboxylic acid group. Thereby, lithium ions are easily inserted in the anode and extracted from the anode, and decomposition of the electrolytic solution is prevented.

39 Claims, 9 Drawing Sheets

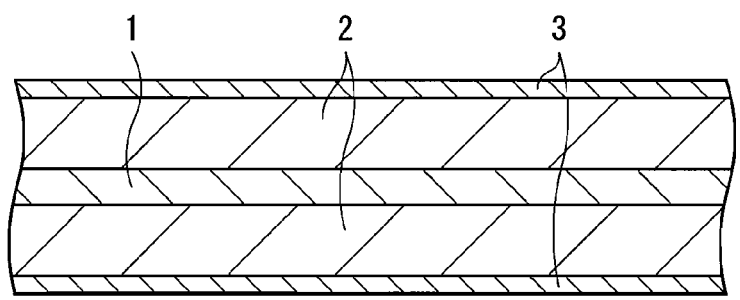
F I G. 1

ANODE, BATTERY, AND METHODS OF MANUFACTURING THEM

CROSS REFERENCES TO RELATED APPLICATIONS

The present invention contains subject matter related to Japanese Patent Application JP 2007-307436 filed in the Japanese Patent Office on Nov. 28, 2007, the entire contents of which being incorporated herein by reference.

BACKGROUND OF THE INVENTION

1. Field of the Invention

The present invention relates to an anode having an anode active material layer on an anode current collector, a battery including the anode, and methods of manufacturing the anode and the battery.

2. Description of the Related Art

In recent years, portable electronic devices such as combination cameras (videotape recorder), mobile phones, and notebook personal computers have been widely used, and it is strongly demanded to reduce their size and weight and to achieve their long life. Accordingly, as a power source, a battery, in particular a light-weight secondary batter capable of providing a high energy density has been developed.

Specially, a secondary battery using insertion and extraction of lithium (Li) for charge and discharge reaction (so-called lithium ion secondary battery) is extremely prospective, since such a secondary battery is able to provide a higher energy density compared to a lead battery and a nickel cadmium battery. The lithium ion secondary battery has a cathode, an anode, and an electrolytic solution. The anode has an anode active material layer on an anode current collector.

As an anode active material contained in the anode active material layer, a carbon material such as graphite has been widely used. In recent years, as the high performance and the multi functions of the portable electronic devices are developed, further improvement of the battery capacity is demanded. Thus, it has been considered to use silicon, tin or the like instead of the carbon material. Since the theoretical capacity of silicon (4199 mAh/g) and the theoretical capacity of tin (994 mAh/g) are significantly higher than the theoretical capacity of graphite (372 mAh/g), it is prospected that the battery capacity is thereby highly improved.

However, in the lithium ion secondary battery, the anode active material inserting lithium in charge and discharge is highly activated, the electrolytic solution is easily decomposed, and lithium is easily inactivated. Thus, it is hard to obtain sufficient cycle characteristics. In addition, the secondary battery is easily swollen by being affected by gas generated in decomposition of the electrolytic solution. Thus, the swollenness characteristics may be lowered. The former disadvantage is significant in the case where silicon or the like having high theoretical capacity is used as an anode active material. The latter disadvantage is significant in the case where the battery structure is laminated film type using a film package member.

Therefore, to improve the various disadvantages of the lithium ion secondary battery, various considerations have been made. Specifically, to improve the load characteristics and the low temperature characteristics, a technique that a phenyl sulfone acid metal salt is contained in an electrolytic solution has been proposed (for example, refer to Japanese Unexamined Patent Application Publication No. 2002-056891). Further, to improve the battery characteristics, a technique that an organic alkali earth metal salt is contained in an electrolytic solution has been proposed (for example, refer to Japanese Unexamined Patent Application Publication No. 2000-268863). Further, to improve the storage characteristics and the cycle characteristics, a technique that a hydroxycarboxylic acid is contained in an electrolytic solution has been proposed (for example, refer to Japanese Unexamined Patent Application Publication No. 2003-092137). In addition, to prevent the battery capacity from being lowered, a technique that a carbon material as an anode active material is coated with a lithium alkoxide compound has been proposed (for example, refer to Japanese Unexamined Patent Application Publication No. 08-138745).

SUMMARY OF THE INVENTION

In these years, the high performance and the multi functions of the portable electronic devices are increasingly developed, and the electric power consumption tends to be increased. Accordingly, charge and discharge of the secondary battery are frequently repeated, and thus the cycle characteristics tend to be easily lowered. In addition, the portable electronic devices are widely prevalent in various fields. Thus, in transport time, in use, in carrying them or the like, the secondary battery may be exposed in high temperature atmosphere, and therefore the secondary battery is in a state of being easily swollen. Accordingly, further improvement of the cycle characteristics and the swollenness characteristics of the secondary battery have been aspired.

In view of the foregoing, in the invention, it is desirable to provide an anode capable of improving the cycle characteristics and the swollenness characteristics, a battery, and methods of manufacturing the anode and the battery According to an embodiment of the invention, there is provided an anode having a coat on an anode active material layer provided on an anode current collector, wherein the coat contains a metal salt shown in Chemical formula 1.

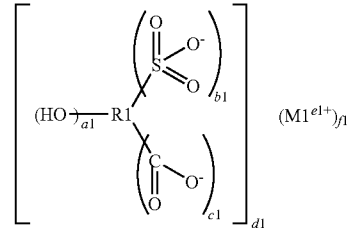

Chemical formula 1

In the formula, R1 is a (a1+b1+c1) valent group. M1 is a metal element. a1, d1, e1, and f1 are an integer number of 1 or more. b1 and c1 are an integer number of 0 or more, where (b1+c1)≥1 is effected.

According to an embodiment of the invention, there is provided a method of manufacturing an anode having a coat on an anode active material layer provided on an anode current collector, wherein the coat is formed on the anode active material layer with the use of a solution containing a metal salt shown in Chemical formula 1.

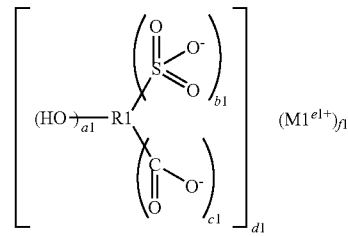

Chemical formula 1

In the formula, R1 is a (a1+b1+c1) valent group. M1 is a metal element. a1, d1, e1, and f1 are an integer number of 1 or more. b1 and c1 are an integer number of 0 or more, where (b1+c1)≥1 is effected.

According to an embodiment of the invention, there is provided a battery including a cathode, an anode, and an electrolytic solution, wherein the anode has a coat on an anode active material layer provided on an anode current collector, and the coat contains a metal salt shown in Chemical formula 1.

Chemical formula 1

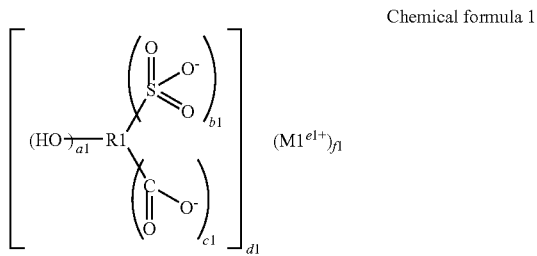

In the formula, R1 is a (a1+b1+c1) valent group. M1 is a metal element. a1, d1, e1, and f1 are an integer number of 1 or more. b1 and c1 are an integer number of 0 or more, where (b1+c1)≥1 is effected.

According to an embodiment of the invention, there is provided a method of manufacturing a battery including a cathode, an anode, and an electrolytic solution in which the anode has a coat on an anode active material layer provided on an anode current collector, wherein the coat is formed on the anode active material layer with the use of a solution containing a metal salt shown in Chemical formula 1.

Chemical formula 1

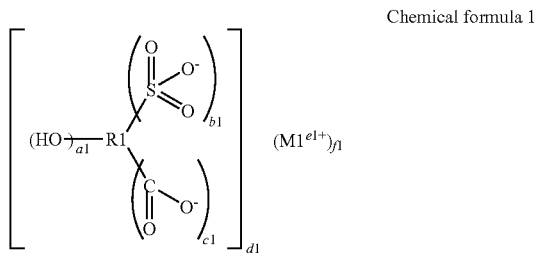

In the formula, R1 is a (a1+b1+c1) valent group. M1 is a metal element. a1, d1, e1, and f1 are an integer number of 1 or more. b1 and c1 are an integer number of 0 or more, where (b1+c1)≥1 is effected.

According to the anode and the method of manufacturing it of the embodiments of the invention, the coat containing the metal salt shown in Chemical formula 1 is formed on the anode active material layer. Thus, compared to a case not forming the coat, the chemical stability of the anode is improved. Therefore, in the case where the anode is used for an electrochemical device such as a battery, an electrode reactant is efficiently inserted in the anode and extracted from the anode. In addition, the anode is hardly reacted with other material such as an electrolytic solution. Thereby, according to the anode, the battery using the method of manufacturing the anode, and the method of manufacturing the battery of the embodiments of the invention, the cycle characteristics and the swollenness characteristics are able to be improved. In this case, the coat is formed by using a solution containing the metal salt shown in Chemical formula 1. Thus, compared to a case using a method necessitating special environmental conditions such as reduced pressure environment, a favorable coat is able to be easily formed.

Other and further objects, features and advantages of the invention will appear more fully from the following description.

BRIEF DESCRIPTION OF THE DRAWINGS

FIG. 1 is a cross sectional view showing a structure of an anode according to an embodiment of the invention;

DETAILED DESCRIPTION OF THE PREFERRED EMBODIMENT

Figure 2:
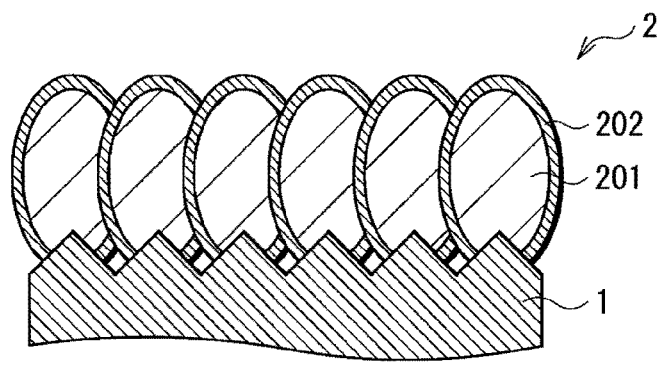
FIG. 2 is a cross sectional view showing an enlarged part of the anode shown in FIG. 1.

An embodiment of the invention will be hereinafter described in detail with reference to the drawings.

FIG. 1 shows a cross sectional structure of an anode according to an embodiment of the invention. The anode is used, for example, for an electrochemical device such as a battery. The anode has an anode current collector 1 having a pair of faces, an anode active material layer 2 provided on the anode current collector 1, and a coat 3 provided on the anode active material layer 2. The anode active material layer 2 may be provided on the both faces of the anode current collector 1, or may be provided on only a single face thereof. The same is applied to the coat 3.

The anode current collector 1 is preferably made of a metal material having favorable electrochemical stability, favorable electric conductivity, and favorable mechanical strength. As such a metal material, for example, copper, nickel, stainless and the like are cited. Specially, copper is preferable since a high electric conductivity is thereby obtained.

In particular, the foregoing metal material preferably contains one or more metal elements not forming an intermetallic compound with an electrode reactant. In the case where the intermetallic compound is formed with the electrode reactant, lowering of the current collectivity characteristics and separation of the anode active material layer 2 from the anode current collector 1 may occur, being affected by a stress due to expansion and shrinkage of the anode active material layer 2 while the electrochemical device is operated (for example, in charging and discharging the battery). As the foregoing metal element, for example, copper, nickel, titanium, iron, chromium (Cr) and the like are cited.

The foregoing metal material preferably contains one or more metal elements being alloyed with the anode active material layer 2. Thereby, the contact characteristics between the anode current collector 1 and the anode active material layer 2 are improved, and thus the anode active material layer 2 is hardly separated from the anode current collector 1. As a metal element that does not form an intermetallic compound with the electrode reactant and is alloyed with the anode active material layer 2, for example, in the case that the anode active material layer 2 contains silicon as an anode active material, copper, nickel, iron and the like are cited. These metal elements are preferable in terms of the strength and the electric conductivity as well.

The anode current collector 1 may have a single layer structure or a multilayer structure. In the case where the anode current collector 1 has the multilayer structure, for example, it is preferable that the layer adjacent to the anode active material layer 2 is made of a metal material being alloyed with the anode active material layer 2, and layers not adjacent to the anode active material layer 2 are made of other metal material.

The surface of the anode current collector 1 is preferably roughened. Thereby, due to the so-called anchor effect, the contact characteristics between the anode current collector 1 and the anode active material layer 2 are improved. In this case, it is enough that at least the surface of the anode current collector 1 in the region opposed to the anode active material layer 2 is roughened. As a roughening method, for example, a method of forming fine particles by electrolytic treatment and the like are cited. The electrolytic treatment is a method of providing concavity and convexity by forming fine particles on the surface of the anode current collector 1 by electrolytic method in an electrolytic bath. A copper foil provided with the electrolytic treatment is generally called "electrolytic copper foil."

The anode active material layer 2 contains, as an anode active material, one or more anode materials capable of inserting and extracting an electrode reactant. If necessary, the anode active material layer 2 may contain other material such as a binder and an electrical conductor.

As the anode material capable of inserting and extracting the electrode reactant, for example, a material that is capable of inserting and extracting the electrode reactant, and has at least one of metal elements and metalloid elements as an element is cited, since a high energy density is thereby obtained. Such an anode material may be a simple substance, an alloy, or a compound of a metal element or a metalloid element, or may have one or more phases thereof at least in part.

In the invention, "alloys" include an alloy containing one or more metal elements and one or more metalloid elements, in addition to an alloy composed of two or more metal elements. Further, "alloy" may contain a nonmetallic element. The texture thereof includes a solid solution, a eutectic crystal (eutectic mixture), an intermetallic compound, and a texture in which two or more thereof coexist.

As the foregoing metal element or the foregoing metalloid element, for example, a metal element or a metalloid element capable of forming an alloy with the electrode reactant is cited. Specifically, magnesium (Mg), boron (B), aluminum, gallium (Ga), indium (In), silicon, germanium (Ge), tin, lead (Pb), bismuth (Bi), cadmium (Cd), silver (Ag), zinc, hafnium (Hf), zirconium (Zr), yttrium (Y), palladium (Pd), platinum (Pt) and the like are cited. Specially, at least one of silicon and tin is preferable, and silicon is more preferable. Silicon has the high ability to insert and extract the electrode reactant, and provides a high energy density.

As an anode material having at least one of silicon and tin, for example, the simple substance, an alloy, or a compound of silicon; the simple substance, an alloy, or a compound of tin; or a material having one or more phases thereof at least in part are cited. One thereof may be used singly, or a plurality thereof may be used by mixture.

As the alloy of silicon, for example, an alloy containing at least one selected from the group consisting of tin, nickel, copper, iron, cobalt, manganese, zinc, indium, silver, titanium, germanium, bismuth, antimony, and chromium as the second element other than silicon is cited. As the compound of silicon, for example, a compound containing oxygen or carbon (C) is cited, and may contain the foregoing second element in addition to silicon. Examples of the alloy or the compound of silicon include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, $SiO_v$ ($0<v\leq2$), $SnO_w$ ($0<w\leq2$), LiSiO and the like.

As the alloy of tin, for example, an alloy containing at least one selected from the group consisting of silicon, nickel, copper, iron, cobalt, manganese, zinc, indium, silver, titanium, germanium, bismuth, antimony, and chromium as the second element other than tin is cited. As a compound of tin, for example, a compound containing oxygen or carbon is cited, and may contain the foregoing second element in addition to tin. Examples of the alloy or the compound of tin include $SnSiO_3$, LiSnO, $Mg_2Sn$ and the like.

In particular, as the anode material containing at least one of silicon and tin, for example, an anode material containing the second element and the third element in addition to tin as the first element is preferable. The second element is at least one selected from the group consisting of cobalt, iron, magnesium, titanium, vanadium (V), chromium, manganese, nickel, copper, zinc, gallium, zirconium, niobium (Nb), molybdenum, silver, indium, cerium (Ce), hafnium, tantalum (Ta), tungsten (W), bismuth, and silicon. The third element is at least one selected from the group consisting of boron, carbon, aluminum, and phosphorus (P). In the case where the second element and the third element are contained, the cycle characteristics are improved in the case where the anode is used for an electrochemical device such as a battery.

Specially, a SnCoC-containing material that has tin, cobalt, and carbon as an element, in which the carbon content is in the range from 9.9 wt % to 29.7 wt %, both inclusive, and the cobalt ratio to the total of tin and cobalt (Co/(Sn+Co)) is in the range from 30 wt % to 70 wt %, both inclusive is preferable. In such a composition range, a high energy density is able to be obtained.

The SnCoC-containing material may further have other element according to needs. As other element, for example, silicon, iron, nickel, chromium, indium, niobium, germanium, titanium, molybdenum, aluminum, phosphorus, gallium, bismuth or the like is preferable. Two or more thereof may be contained, since thereby higher effect is obtained.

The SnCoC-containing material has a phase containing tin, cobalt, and carbon. Such a phase preferably has a low crystalline structure or a amorphous structure. Further, in the SnCoC-containing material, at least part of carbon as an element is preferably bonded to a metal element or a metalloid element as other element. Cohesion or crystallization of tin or the like is thereby prevented.

The SnCoC-containing material is able to be formed by, for example, mixing raw materials of each element, dissolving the resultant mixture in an electric furnace, a high frequency induction furnace, an arc melting furnace or the like and then solidifying the resultant. Otherwise, the SnCoC-containing material may be formed by various atomization methods such as gas atomizing and water atomizing; various roll methods; or a method using mechanochemical reaction such as mechanical alloying method and mechanical milling method. Specially, the SnCoC-containing material is preferably formed by the method using mechanochemical reaction, since thereby the anode active material has a low crystalline structure or an amorphous structure. For the method using the mechanochemical reaction, for example, a manufacturing apparatus such as a planetary ball mill and an attliter is able to be used.

As a measurement method for examining bonding state of elements, for example, X-ray Photoelectron Spectroscopy (XPS) is cited. In XPS, in the case of graphite, the peak of 1s orbit of carbon (C1s) is observed at 284.5 eV in the apparatus in which energy calibration is made so that the peak of 4f orbit of gold atom (Au4f) is observed at 84.0 eV. In the case of surface contamination carbon, the peak is observed at 284.8 eV. Meanwhile, in the case of higher electric charge density of carbon element, for example, if carbon is bonded to a metal element or a metalloid element, the peak of C1s is observed in the region lower than 284.5 eV. That is, in the case where the peak of the composite wave of C1s obtained for the SnCoC-containing material is observed in the region lower than 284.5 eV, at least part of carbon contained in the SnCoC-containing material is bonded to the metal element or the metalloid element as other element.

In XPS, for example, the peak of C1s is used for correcting the energy axis of spectrums. Since surface contamination carbon generally exists on the surface, the peak of C1s of the surface contamination carbon is set to in 284.8 eV, which is used as an energy reference. In XPS, the waveform of the peak of C1s is obtained as a form including the peak of the surface contamination carbon and the peak of carbon in the SnCoC-containing material. Therefore, for example, by performing analysis with the use of commercially available software, the peak of the surface contamination carbon and the peak of carbon in the SnCoC-containing material are separated. In the analysis of the waveform, the position of the main peak existing on the lowest bound energy side is set to the energy reference (284.8 eV).

The anode active material layer 2 using the simple substance, an alloy, or a compound of silicon; the simple substance, an alloy, or a compound of tin; or a material having one or more phases thereof at least in part as the anode material is, for example, formed by using vapor-phase deposition method, liquid-phase deposition method, spraying method, coating method, firing method, or a combination of two or more of these methods. In this case, the anode current collector 1 and the anode active material layer 2 are preferably alloyed in at least part of the interface thereof. Specifically, at the interface thereof, the element of the anode current collector 1 may be diffused in the anode active material layer 2; or the element of the anode active material layer 2 may be diffused in the anode current collector 1; or these elements may be diffused in each other. Thereby, destruction due to expansion and shrinkage of the anode active material layer 2 in charge and discharge is prevented, and the electron conductivity between the anode current collector 1 and the anode active material layer 2 is improved.

As vapor-phase deposition method, for example, physical deposition method or chemical deposition method are cited. Specifically, vacuum evaporation method, sputtering method, ion plating method, laser ablation method, thermal Chemical Vapor Deposition (CVD) method, plasma CVD method and the like are cited. As liquid-phase deposition method, a known technique such as electrolytic plating and electroless plating may be used. Coating method is a method in which, for example, after a particulate anode active material is mixed with a binder and the like, the resultant mixture is dispersed in a solvent and then coating is provided. Firing method is, for example, a method in which after coating is provided by coating method, heat treatment is provided at temperature higher than the melting point of the binder or the like. For firing method, a known technique such as atmosphere firing method, reactive firing method, and hot press firing method is cited as well.

In addition to the foregoing, as the anode material capable of inserting and extracting the electrode reactant, for example, a carbon material is cited. As the carbon material, for example, graphitizable carbon, non-graphitizable carbon in which the spacing of (002) plane is 0.37 nm or more, or graphite in which the spacing of (002) plane is 0.34 nm or less and the like are cited. More specifically, pyrolytic carbon, coke, glassy carbon fiber, an organic polymer compound fired body, activated carbon, carbon black and the like are cited. The coke includes pitch coke, needle coke, petroleum coke and the like. The organic polymer compound fired body is obtained by firing and carbonizing a phenol resin, a furan resin or the like at appropriate temperature. In the carbon material, the crystal structure change associated with insertion and extraction of the electrode reactant is very little. Therefore, for example, by using the carbon material with other anode material, a high energy density is obtained, and superior cycle characteristics are obtained in the case where the anode is used for an electrochemical device such as a battery. In addition, the carbon material also functions as an electrical conductor, and thus the carbon material is preferably used. The shape of the carbon material may be any of a fibrous shape, a spherical shape, a granular shape, and a scale-like shape.

As the anode material capable of inserting and extracting the electrode reactant, for example, a metal oxide, a polymer compound and the like capable of inserting and extracting the electrode reactant are cited. As the metal oxide, for example, iron oxide, ruthenium oxide, molybdenum oxide and the like are cited. As the polymer compound, for example, polyacetylene, polyaniline, polypyrrole and the like are cited.

It is needless to say that the anode material may be a material other than the foregoing materials. Further, the two or more of the foregoing series of anode materials may be used by mixture voluntarily.

The anode active material is composed of a plurality of particles. That is, the anode active material layer 2 has a plurality of anode active material particles. The anode active material particles are formed by, for example, the foregoing vapor-phase deposition method or the like. However, the anode active material particles may be formed by a method other than vapor-phase deposition method.

In the case where the anode active material particles are formed by vapor-phase deposition method, the anode active material particles may have a single layer structure formed by a single deposition step or may have a multilayer structure formed by a plurality of deposition steps. However, if the anode active material particles are formed by evaporation method or the like associated with high heat in deposition, the anode active material particles preferably have a multilayer structure. In the case where the deposition step of the anode material is divided into several steps (a plurality of thin layers of the anode material are sequentially formed and deposited), time that the anode current collector 1 is exposed at high heat is shortened compared to a case that the deposition is performed in a single deposition step, accordingly the anode current collector 1 is hardly subject to thermal damage.

The anode active material particles are grown, for example, in the thickness direction of the anode active material layer 2 from the surface of the anode current collector 1. The anode active material particles are linked to the anode current collector 1 at the root thereof. In this case, it is preferable that the anode active material particles are formed by vapor-phase deposition method, and at least part of the interface with the anode current collector 1 is alloyed. Specifically, at the interface in between, the element of the anode current collector 1 may be diffused in the anode active material particles; or the element of the anode active material particles may be diffused in the anode current collector 1; or these elements may be diffused in each other. As described above, destruction due to expansion and shrinkage of the anode active material layer 2 in charge and discharge is thereby prevented, and electron conductivity between the anode current collector 1 and the anode active material layer 2 is thereby improved.

In particular, if necessary, the anode active material layer 2 preferably has an oxide-containing film covering the surface of the anode active material particles (region contacted with the electrolytic solution). Thereby, in the case where the anode is used for an electrochemical device such as a battery including an electrolytic solution, the oxide-containing film functions as a protection film to the electrolytic solution, and decomposition reaction of the electrolytic solution is prevented even if charge and discharge are repeated. The oxide-containing film may cover part of the surface of the anode active material particles, or may cover the entire surface of the anode active material particles.

The oxide-containing film contains, for example, an oxide of at least one selected from the group consisting of silicon, germanium, and tin. Specially, the oxide-containing film preferably contains an oxide of silicon. Thereby, the oxide-containing film easily covers over the entire surface of the anode active material particles, and is able to provide superior protective function. It is needless to say that the oxide-containing film contains an oxide other than the foregoing oxide. The oxide-containing film is formed by, for example, vapor-phase deposition method or liquid-phase deposition method. Specially, liquid-phase deposition method such as liquid-phase precipitation method, solgel method, coating method, and dip coating method is preferable, and the liquid-phase precipitation method is more preferable, since thereby the surface of the anode active material particles is easily covered over a wide range.

If necessary, the anode active material layer 2 preferably has a metal material not being alloyed with the electrode reactant in a gap between the anode active material particles or in a gap in the particles. Thereby, the plurality of anode active materials are bound to each other with the metal material in between. In addition, in the case where the metal material exists in the foregoing gap, expansion and shrinkage of the anode active material layer 2 are prevented. Accordingly, the cycle characteristics are improved in the case where the anode is used for an electrochemical device such as a battery.

The metal material has, for example, a metal element not being alloyed with the electrode reactant. As the metal element, for example, at least one selected from the group consisting of iron, cobalt, nickel, zinc, and copper is cited. Specially, cobalt is preferable, since thereby the metal material easily intrudes into the foregoing gap, and superior binding function is obtained. It is needless to say that the metal material may have a metal element other than the foregoing metal elements. However, "metal material" herein is a comprehensive term, including not only a simple substance but also an alloy and a metal compound. The metal material is formed by, for example, vapor-phase deposition method or liquid-phase deposition method. Specially, the liquid-phase deposition method such as electrolytic plating method and non-electrolytic plating method is preferable, and the electrolytic plating method is more preferable. Thereby, the metal material easily intrudes into the foregoing gap, and the formation time thereof is shortened.

The anode active material layer 2 may have one of the foregoing oxide-containing film or the metal material, or may have both thereof. However, to more improve the cycle characteristics of an electrochemical device such as a battery, the anode active material layer 2 preferably contains both thereof.

A description will be given in detail of the anode with reference to FIG. 2 to FIG. 5.

Figure 3:
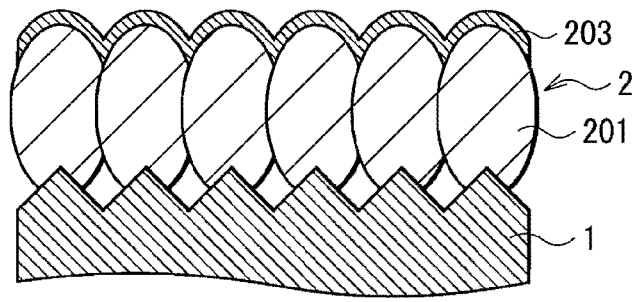
FIG. 3 is a cross sectional view showing an anode of a reference example to the anode shown in FIG. 2.

First, a description will be given of a case that the anode active material layer 2 has the oxide-containing film together with the plurality of anode active material particles. FIG. 2 schematically shows a cross sectional structure of the anode of the invention. FIG. 3 schematically shows a cross sectional structure of an anode of a reference example. FIG. 2 and FIG. 3 show a case that the anode active material particles have a single layer structure.

In the anode of the invention, as shown in FIG. 2, for example, when the anode material is deposited on the anode current collector 1 by vapor-phase deposition method such as evaporation method, a plurality of anode active material particles 201 are formed on the anode current collector 1. In this case, in the case where the surface of the anode current collector 1 is roughened and a plurality of projections (for example, fine particles formed by electrolytic treatment) exist on the surface thereof, the anode active material particles 201 are grown for every projection described above in the thickness direction. Thus, the plurality of anode active material particles 211 are arranged on the anode current collector 1, and are linked to the anode current collector 1 at the root thereof. After that, for example, in the case where an oxide-containing film 202 is formed on the surface of the anode active material particle 201 by liquid-phase deposition method such as liquid-phase precipitation method, the oxide-containing film 202 covers almost entire surface of the anode active material particle 201, in particular, covers a wide range from the apex section to the root of the anode active material particle 201. Such a covering state in the wide range with the oxide-containing film 202 is a characteristic obtained in the case where the oxide-containing film 202 is formed by liquid-phase deposition method. That is, in the case where the oxide-containing film 202 is formed by liquid-phase deposition method, such covering action is applied not only to the apex section of the anode active material particle 201 but also to the root thereof. Accordingly, the anode active material particle 201 is covered with the oxide-containing film 202 down to the root thereof.

Meanwhile, in the anode of the reference example, as shown in FIG. 3, for example, in the case where the plurality of anode active material particles 201 are formed by vapor-phase deposition method and then an oxide-containing film 203 is formed by vapor-phase deposition method such as evaporation method similarly, the oxide-containing film 203 covers only the apex section of the anode active material particle 201. Such a small range covered with the oxide-containing film 203 is a characteristic obtained in the case where the oxide-containing film 203 is formed by vapor-phase deposition method. That is, in the case where the oxide-containing film 203 is formed by vapor-phase deposition method, such covering action is applied to the apex section of the anode active material particle 201 but not applied to the root thereof. Accordingly, the anode active material particle 201 is not covered with the oxide-containing film 203 down to the root thereof.

In FIG. 2, the description has been given of a case that the anode active material layer 2 is formed by vapor-phase deposition method. However, in the case where the anode active material layer 2 is formed by sintering method or the like, an oxide-containing film is similarly formed to cover almost entire surface of the plurality of anode active material particles.

Figure 4A:
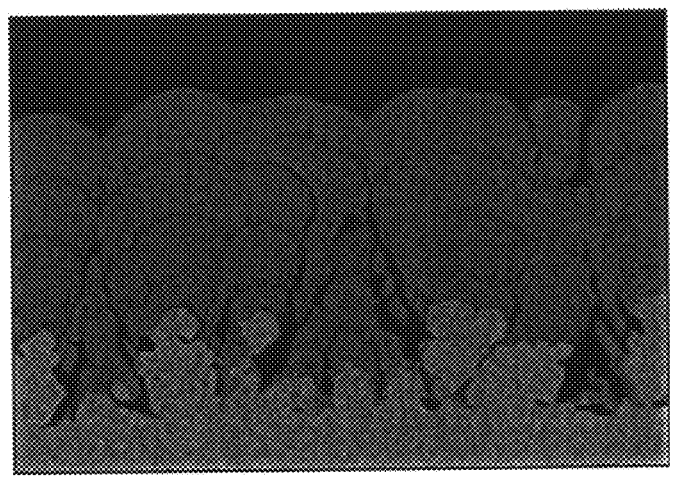
FIGS. 4A and 4B are an SEM photograph showing a cross sectional structure of the anode shown in FIG. 1 and a schematic view thereof.
Figure 4B:
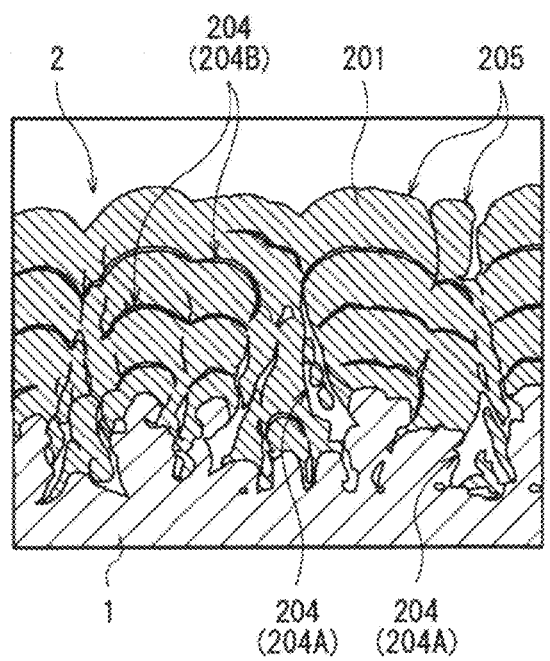

Next, a description will be given of a case that the anode active material layer 2 has the plurality of anode active material particles and the metal material not being alloyed with the electrode reactant. FIGS. 4A and 4B show an enlarged cross sectional structure of the anode. FIG. 4A is a Scanning Electron Microscope (SEM) photograph (secondary electron image), and FIG. 4B is a schematic drawing of the SEM image shown in FIG. 4A. FIGS. 4A and 4B show a case that the plurality of anode active material particles have a multi-layer structure in the particles.

In the case where the anode active material particles 201 have the multilayer structure, a plurality of gaps 204 are generated in the anode active material layer 2 due to the dense structure, the multilayer structure, and the surface structure of the plurality of anode active material particles 201. The gap 204 mainly includes two types of gaps 204A and 204B categorized according to the cause of generation. The gap 204A is a gap generated between adjacent anode active material particles 201. Meanwhile, the gap 204B is a gap generated between each layer in the anode active material particles 201.

On the exposed face (outermost surface) of the anode active material particle 201, a void 205 may be generated. As a fibrous minute projection (not shown) is generated on the surface of the anode active material particles 201, the void 205 is generated between the projections. The void 205 may be generated entirely over the exposed face of the anode active material particles 201, or may be generated in only part thereof. Since the foregoing fibrous minute projection is generated on the surface of the anode active material particles 201 every time the anode active material particles 201 are formed, the void 205 may be generated between each layer in addition to on the exposed face of the anode active material particles 201.

Figure 5A:
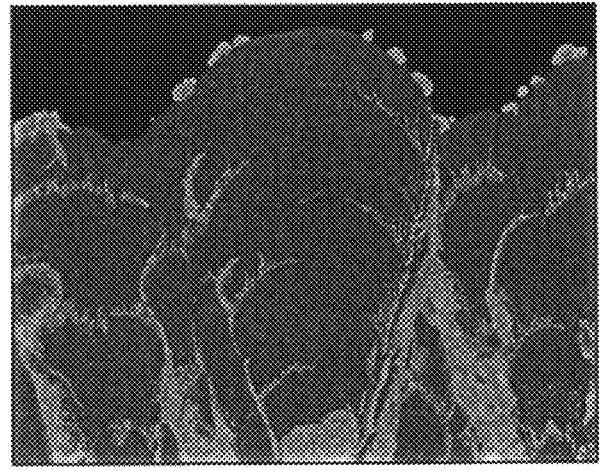
FIGS. 5A and 5B are an SEM photograph showing another cross sectional structure of the anode shown in FIG. 1 and a schematic view thereof.
Figure 5B:
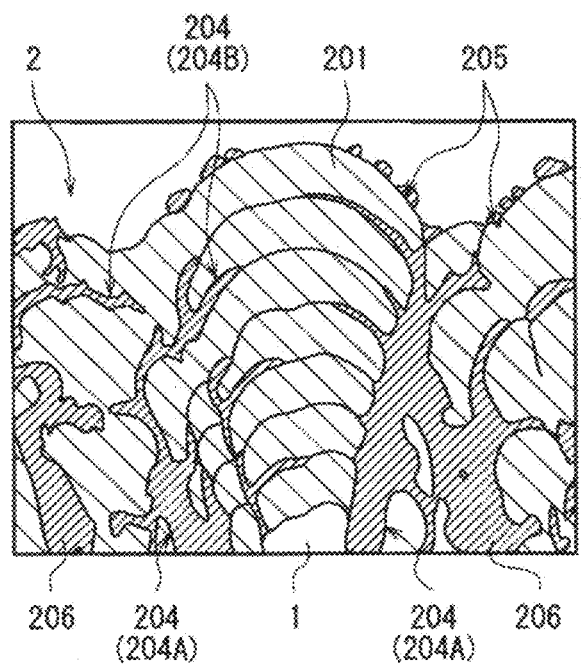

FIGS. 5A and 5B show another cross sectional structure of the anode, and correspond to FIGS. 4A and 4B. The anode active material layer 2 has a metal material 206 not being alloyed with the electrode reactant in the gaps 204A and 204B. In this case, only one of the gaps 204A and 204B may have the metal material 206, but the both gaps 204A and 204B preferably have the metal material 206, since thereby higher effect is obtained.

The metal material 206 intrudes into the gap 204A between adjacent anode active material particles 201. More specifically, in the case where the anode active material particles 201 are formed by vapor-phase deposition method or the like, the anode active material particles 201 are grown for every projection existing on the surface of the anode current collector 1 as described above, and thus the gap 204A is generated between the adjacent anode active material particles 201. The gap 204A causes lowering of the binding characteristics of the anode active material layer 2. Therefore, to improve the binding characteristics, the metal material 206 fills in the foregoing gap 204A. In this case, it is enough that part of the gap 204A is filled therewith, but the larger filling amount is preferable, since thereby the binding characteristics of the anode active material layer 2 are further improved. The filling amount of the metal material 206 is preferably 20% or more, more preferably 40% or more, and much more preferably 80% or more.

Further, the metal material 206 intrudes into the gap 204B in the anode active material particles 201. More specifically, in the case where the anode active material particles 201 have a multilayer structure, the gap 204B is generated between each layer. The gap 204B causes lowering of the binding characteristics of the anode active material layer 2 as the foregoing gap 204A does. Therefore, to improve the binding characteristics, the metal material 206 fills in the foregoing gap 204B. In this case, it is enough that part of the gap 204B is filled therewith, but the larger filling amount is preferable, since thereby the binding characteristics of the anode active material layer 2 are further improved.

To prevent the fibrous minute projection (not shown) generated on the exposed face of the uppermost layer of the anode active material particles 201 from adversely affecting the performance of the electrochemical device, the void 205 may have the metal material 206. More specifically, in the case where the anode active material particles 201 are formed by vapor-phase deposition method or the like, the fibrous minute projections are generated on the surface thereof, and thus the void 205 is generated between the projections. The void 205 causes increase of the surface area of the anode active material particles 201, and accordingly the amount of an irreversible coat formed on the surface is also increased, possibly resulting in lowering of progression of the electrode reaction. Therefore, to avoid the lowering of progression of the electrode reaction, the foregoing void 205 is filled with the metal material 206. In this case, it is enough at minimum that part of the void 205 is filled therewith, but the larger filling amount is preferable, since thereby the lowering of progression of the electrode reaction is further prevented. In FIGS. 5A and 5B, the metal material 206 is dotted on the surface of the uppermost layer of the anode active material particles 201, which means that the foregoing minute projection exists in the location where the metal material 206 is dotted. It is needless to say that the metal material 206 is not necessarily dotted on the surface of the anode active material particles 201, but may cover the entire surface thereof.

In particular, the metal material 206 that intrudes into the gap 204B has a function to fill in the void 205 in each layer. More specifically, in the case where the anode active material particles 201 are deposited several times, the foregoing minute projection is generated on the surface of the anode active material particles 201 for every deposition. Therefore, the metal material 206 fills in not only the gap 204B in each layer, but also the void 205 in each layer.

For confirmation, in FIGS. 4A and 4B and 5A and 5B, the description has been given of a case that the anode active material particles 201 have the multilayer structure, and the both gaps 204A and 204B exist in the anode active material layer 2. Thus, in this case, the anode active material layer 2 has the metal material 206 in the gaps 204A and 204B. Meanwhile, in the case where the anode active material particles 201 have a single layer structure, and only the gap 204A exists in the anode active material layer 2, the anode active material layer 2 has the metal material 206 only in the gap 204A. It is needless to say that the void 205 is generated in the both cases, and thus in any case, the metal material 206 is included in the void 205.

As the electrical conductor, for example, a carbon material such as graphite, carbon black, acetylene black, and Ketjen black is cited. Such a carbon material may be used singly, or a plurality thereof may be used by mixture. The electrical conductor may be a metal material, a conductive polymer molecule or the like as long as the material has the electric conductivity.

As the binder, for example, a synthetic rubber such as styrene-butadiene rubber, fluorinated rubber, and ethylene propylene diene; or a polymer material such as polyvinylidene fluoride are cited. One thereof may be used singly, or a plurality thereof may be used by mixture.

The coat 3 contains a metal salt shown in Chemical formula 1. In the case where the coat 3 containing the metal salt shown in Chemical formula 1 is provided, chemical stability of the anode is improved. Thereby, in the case where the anode is used for an electrochemical device such as a battery, the electrode reactant is efficiently inserted in the anode and extracted from the anode, and the anode is hardly reacted with other material (for example, the electrolytic solution in the battery). In result, the cycle characteristics and the swollenness characteristics are improved.

Chemical formula 1

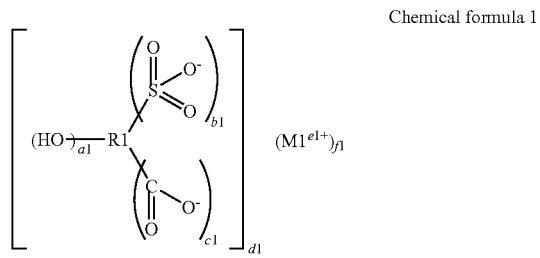

In the formula, R1 is a (a1+b1+c1) valent group. M1 is a metal element. a1, d1, e1, and f1 are an integer number of 1 or more. b1 and c1 are an integer number of 0 or more, where (b1+c1)≥1 is effected.

The coat 3 may be provided to cover the entire face of the anode active material layer 2, or may be provided to cover part of the surface thereof. Part of the coat 3 may intrude into the anode active material layer 2.

The metal salt shown in Chemical formula 1 has a hydroxyl group (—OH) and at least one of a sulfonic acid group (—SO$_3^-$) and a carboxylic acid group (—COO$^-$). The number of the hydroxyl group, the sulfonic acid group, and the carboxylic acid group is able to be set voluntarily.

R1 in Chemical formula 1 may be any group as long as the group is the (a1+b1+c1) valent group. Specially, a group having carbon as a composition element is preferable. As such R1, a chain saturated hydrocarbon group, a chain unsaturated hydrocarbon group, a cyclic saturated hydrocarbon group, a cyclic unsaturated hydrocarbon group, or a halogenated group thereof is cited. In this case, the foregoing hydroxyl group or the like is preferably bonded to the carbon atom in R1. The foregoing "chain hydrocarbon group" may be in a straight chain state or in a branched state. "Halogenated group thereof" means a group obtained by substituting at least partial hydrogen out of the hydrocarbon group with halogen. The halogen type is not particularly limited, but fluorine or chlorine is particularly preferable, and fluorine is more preferable.

M1 in Chemical formula 1 may be any element as long as M1 is a metal element. Specially, M1 is preferably an alkali metal element or an alkali earth metal element. Specifically, as M1, for example, lithium, sodium (Na), magnesium, calcium (Ca) and the like are cited. It is needless to say that M1 may represent two or more metal elements.

Specific examples of the metal salt shown in Chemical formula 1 are as follows.

The metal salt shown in Chemical formula 1 is, for example, a metal salt shown in Chemical formula 2. The metal salt has a hydroxyl group and a sulfonic acid group.

Chemical formula 2

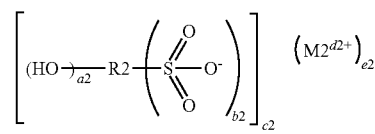

In the formula, R2 is a (a2+b2) valent group. M2 is a metal element. a2, b2, c2, d2, and e2 are an integer number of 1 or more.

Otherwise, the metal salt shown in Chemical formula 1 is a metal salt shown in Chemical formula 3. The metal salt has a hydroxyl group and a carboxylic acid group.

Chemical formula 3

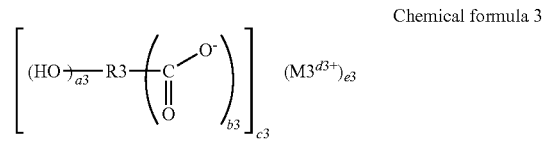

In the formula, R3 is a (a3+b3) valent group. M3 is a metal element. a3, b3, c3, d3, and e3 are an integer number of 1 or more.

Otherwise, the metal salt shown in Chemical formula 1 is a metal salt shown in Chemical formula 4. The metal salt has a hydroxyl group, a sulfo acid group, and a carboxylic acid group.

Chemical formula 4

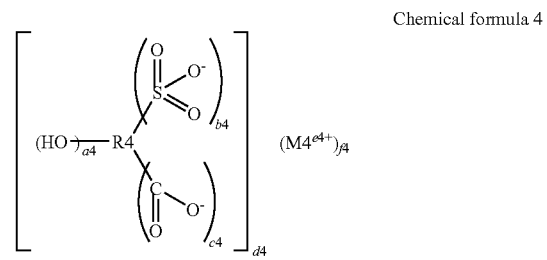

In the formula, R4 is a (a4+b4+c4) valent group. M4 is a metal element. a4, b4, c4, d4, e4, and f4 are an integer number of 1 or more.

As the metal salt shown in Chemical formula 2, for example, the metal salts shown in Chemical formula 5 to Chemical formula 9 are cited. As the metal salt shown in Chemical formula 3, for example, the metal salts shown in Chemical formula 10 to Chemical formula 13 are cited. As the metal salt shown in Chemical formula 4, the metal salts shown in Chemical formula 14 are cited. One thereof may be used singly, or a plurality thereof may be used by mixture. Further, in the metal salts shown in Chemical formula 5 to Chemical formula 14, at least partial hydrogen may be substituted with halogen. Specially, as the metal salt shown in Chemical formula 1, the metal salts shown in Chemical formulas 5(4) and 5(8), Chemical formula 9(3), Chemical formulas 10(5) and 10(8), and Chemical formula 11(1) are preferable, and the metal salts shown in Chemical formulas 5(4) and 5(8), Chemical formulas 10(5) and 10(8), and Chemical formula 11(1) are more preferable. They are easily available, and provide high effect.
Chemical formula 5
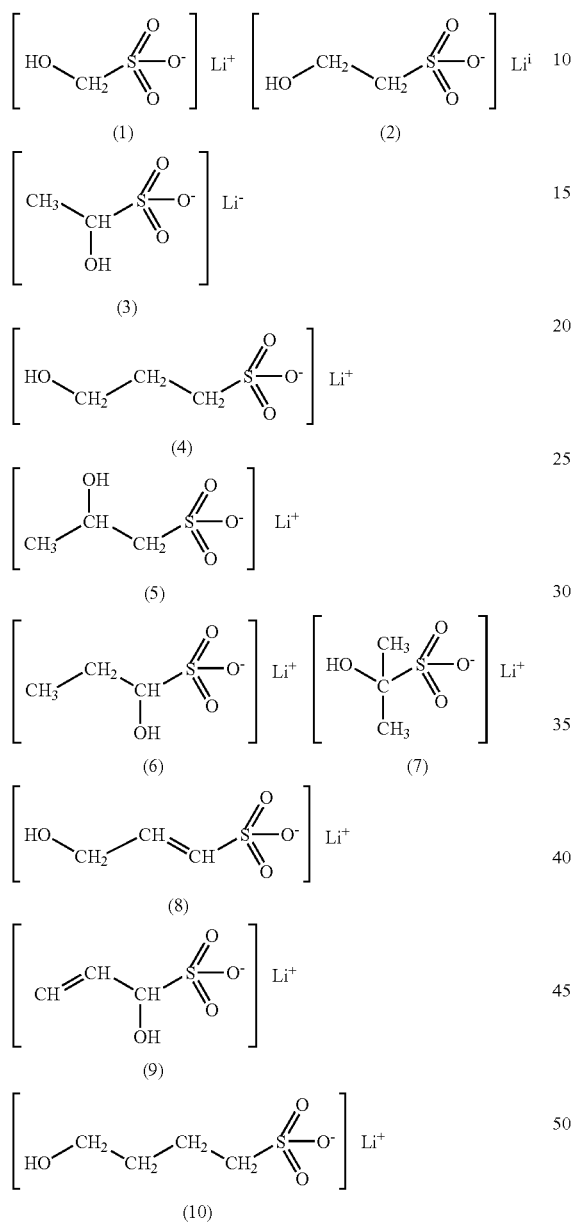
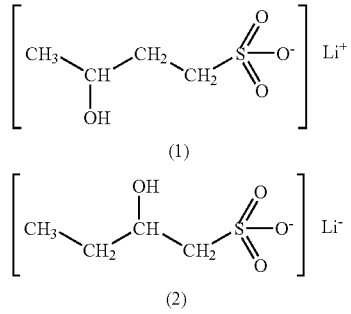
Chemical formula 6
-continued
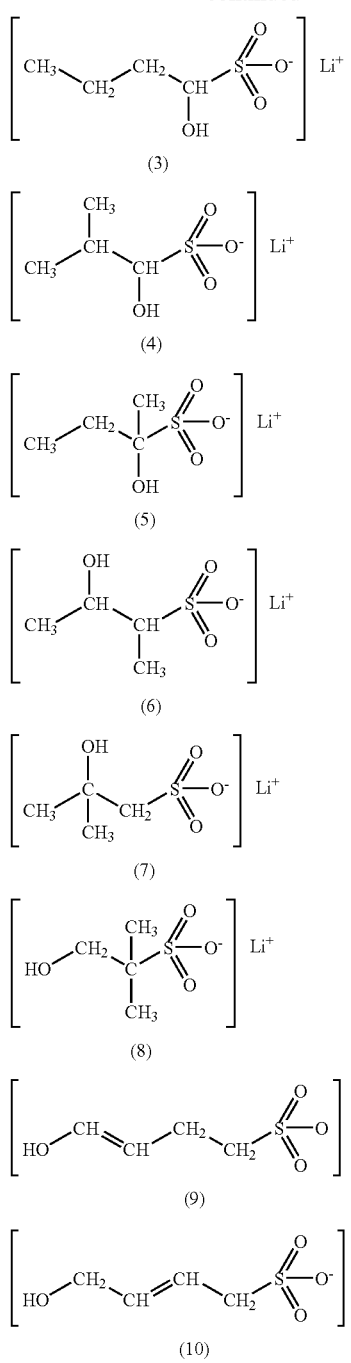
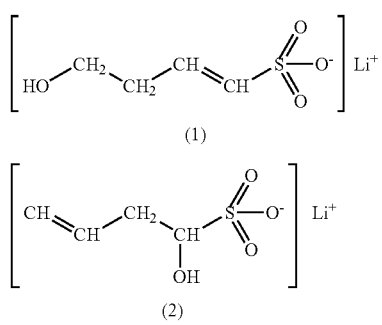
Chemical formula 7

-continued
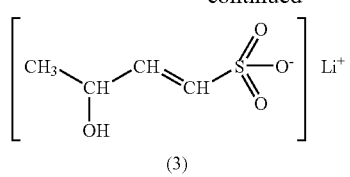
(3)
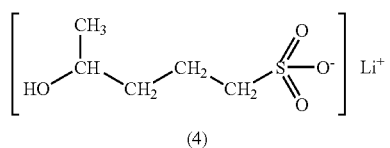
(4)
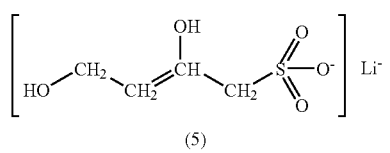
(5)
Chemical formula 8
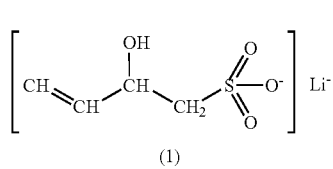
(1)
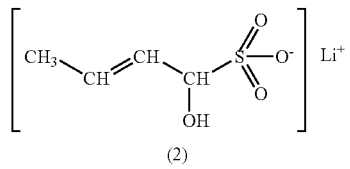
(2)
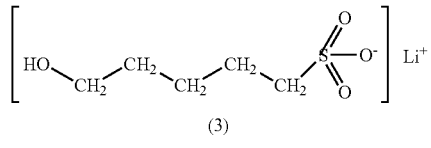
(3)
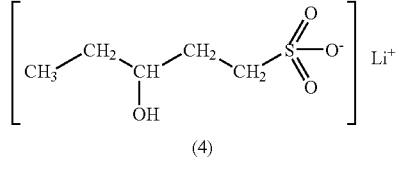
(4)
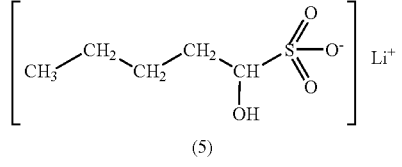
(5)
Chemical formula 9
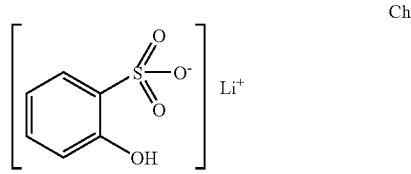
(1)
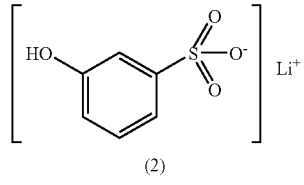
(2)
-continued
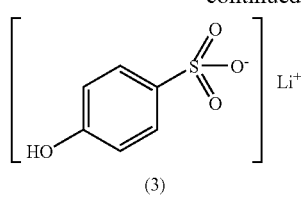
(3)
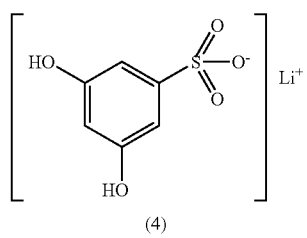
(4)
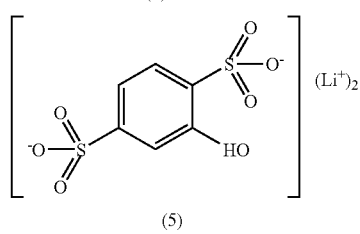
(5)
Chemical formula 10
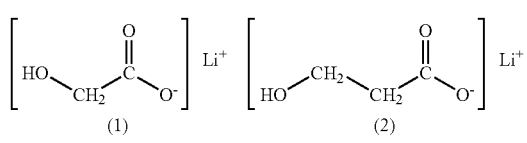
(1) (2)
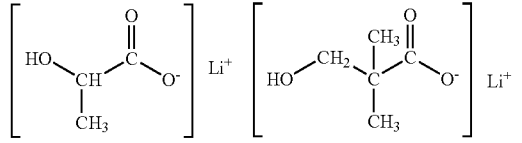
(3) (4)
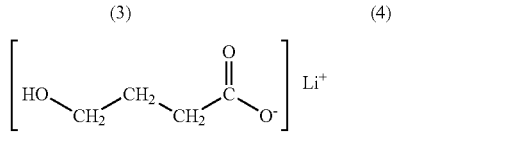
(5)
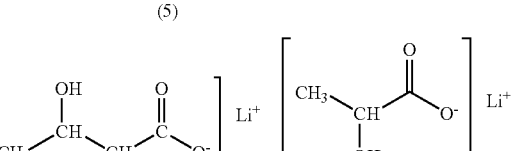
(6) (7)
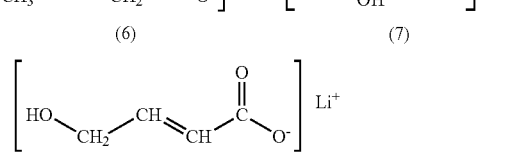
(8)
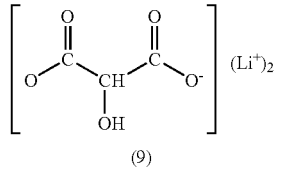
(9)

-continued
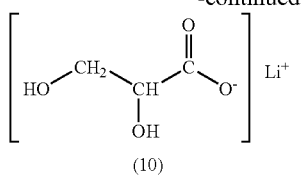
(10)
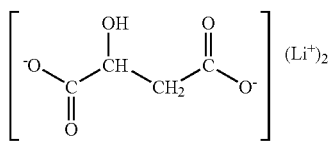
(1)
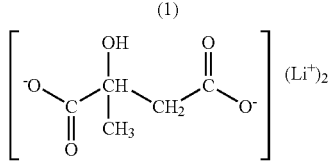
(2)
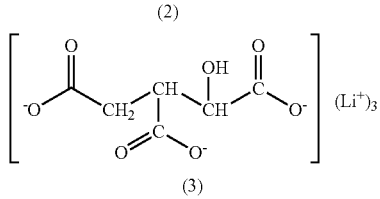
(3)
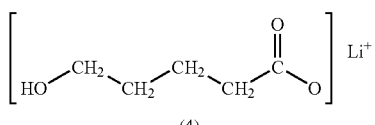
(4)
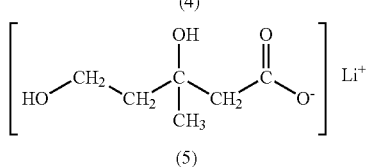
(5)
Chemical formula 12
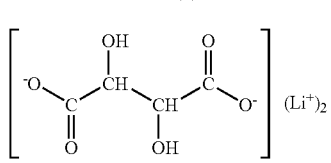
(1)
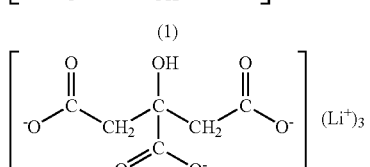
(2)
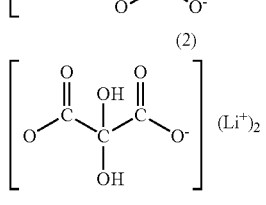
(3)
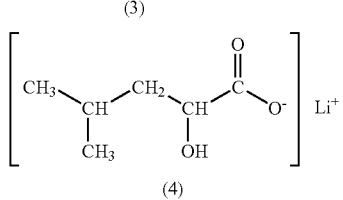
(4)
-continued
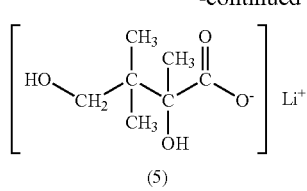
(5)
Chemical formula 11
Chemical formula 13
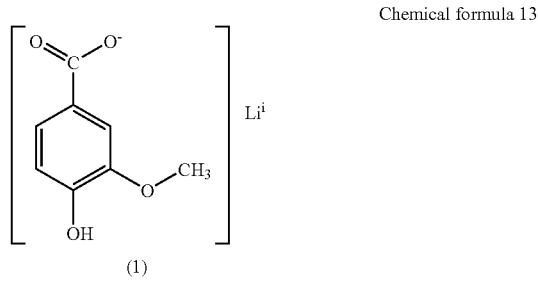
(1)
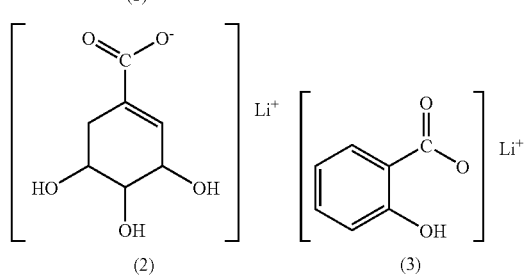
(2)                         (3)
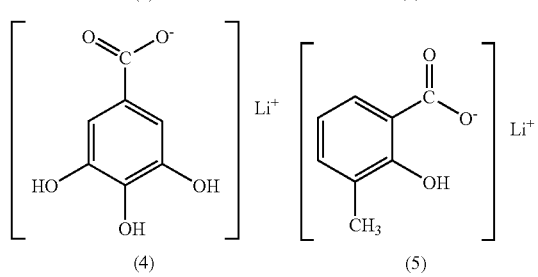
(4)                         (5)
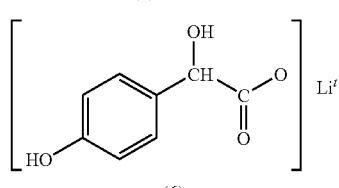
(6)
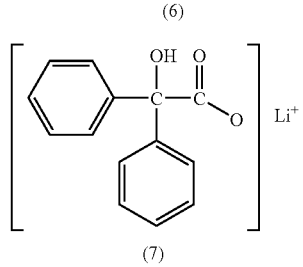
(7)
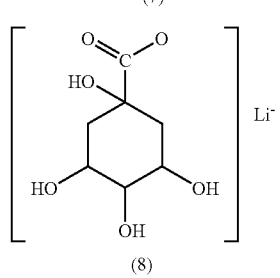
(8)

-continued

Chemical formula 14

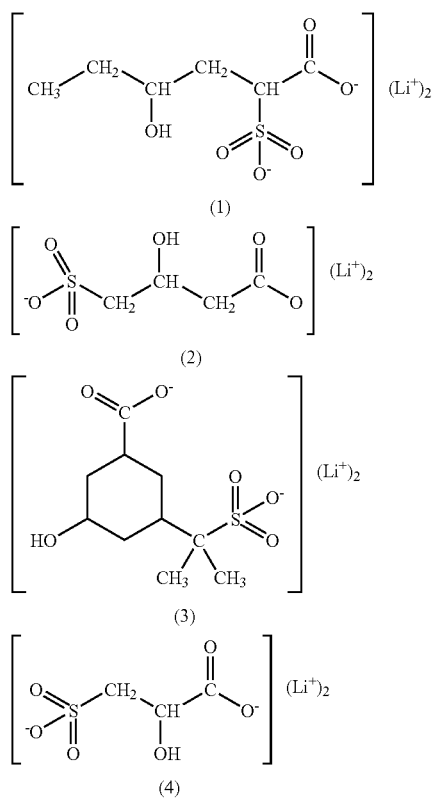

In particular, the coat 3 preferably contains an alkali metal salt or an alkali earth metal salt (except for that corresponding to the metal salt shown in Chemical formula 1) together with the metal salt shown in Chemical formula 1. Thereby, coat resistance is prevented, and thus the cycle characteristics are further improved.

As the alkali metal salt or the alkali earth metal salt, for example, a carbonate, a halide salt, a borate, a phosphate, a sulfonate and the like of the alkali metal element or the alkali earth metal element are cited. Specifically, for example, lithium carbonate ($Li_2CO_3$), lithium fluoride (LiF), lithium tetraborate ($Li_2B_4O_7$), lithium metaborate ($LiBO_2$), lithium pyrophosphate ($Li_4P_2O_7$), lithium tripolyphosphate ($Li_5P_3O_{10}$), lithium orthosilicate ($Li_4SiO_4$), lithium metasilicate ($Li_2SiO_3$), dilithium ethanedisulfonate, dilithium propanedifulfonate, dilithium sulfoacetate, dilithium sulfopropionate, dilithium sulfobutanate, dilithium sulfobenzoate, dilithium succinate, trilithium sulfosuccinate, quadratic acid dilithium, magnesium ethanedisulfonate, magnesium propanedisulfonate, magnesium sulfoacetate, magnesium sulfopropionate, magnesium sulfobutanate, magnesium sulfobenzoate, magnesium succinate, trimagnesium disulfosuccinate, calcium ethanedisulfonate, calcium propanedisulfonate, calcium sulfoacetate, calcium sulfopropionate, calcium sulfobutanate, calcium sulfobenzoate, calcium succinate, tricalcium disulfobenzoate and the like are cited. One thereof may be used singly, or a plurality thereof may be used by mixture.

As a method of forming the coat 3, for example, liquid-phase deposition method such as coating method, dipping method, and dip coating method; and vapor-phase deposition method such as evaporation method, sputtering method, and Chemical Vapor Deposition (CVD) method are cited. One thereof may be used singly, or two or more methods may be used. Specially, as the liquid-phase deposition method, the coat 3 is preferably formed by using a solution containing the metal salt shown in Chemical formula 1. Specifically, for example, in the dipping method, the anode current collector 1 on which the anode active material layer 2 is formed is dipped in the solution containing the metal salt shown in Chemical formula 1. In the coating method, the anode active material layer 2 is coated with the foregoing solution. Thereby, the favorable coat 3 having high chemical stability is easily formed. As a solvent in which the metal salt shown in Chemical formula 1 is dissolved, for example, a solvent having high polarity such as water is cited.

The anode is manufactured, for example, by the following procedure.

First, the anode active material layer 2 is formed on the both faces of the anode current collector 1. In forming the anode active material layer 2, the anode material is deposited on the surface of the anode current collector 1 by vapor-phase deposition method such as evaporation method to form the plurality of anode active material particles. Subsequently, if necessary, the oxide-containing film is formed by liquid-phase method such as liquid-phase precipitation method, or the metal material is formed by liquid-phase deposition method such as electrolytic plating method. Finally, the coat 3 is formed on the surface of the anode active material layer 2. In forming the coat 3, as a solution containing the metal salt shown in Chemical formula 1, for example, an aqueous solution with a concentration in the range from 1 wt % to 5 wt %, both inclusive is prepared. The anode current collector 1 on which the anode active material layer 2 is formed is dipped in a solution for several seconds and taken out. The resultant is dried at room temperature. Otherwise, the foregoing solution is prepared, the surface of the anode active material layer 2 is coated with the foregoing solution, and then the resultant is dried. Thereby, the anode is completed.

According to the anode and the method of manufacturing it, since the coat 3 containing the metal salt shown in Chemical formula 1 is formed on the anode active material layer 2, chemical stability of the anode is improved compared to a case not forming the coat 3. Therefore, in the case where the anode is used for an electrochemical device such as a battery, the electrode reactant is efficiently inserted into the anode and extracted from the anode, and the anode is hardly reacted with other material such as an electrolytic solution. Therefore, the anode and the method of manufacturing it are able to contribute to improving the cycle characteristics and the swollenness characteristics. In this case, the coat 3 is formed by using the solution containing the metal salt shown in Chemical formula 1. Specifically, the simple treatment such as dipping treatment and coating treatment is used. Accordingly, compared to a case using a method necessitating special environmental conditions such as reduced pressure environment, the favorable coat 3 is able to be formed easily.

In particular, in the case where the coat 3 contains an alkali metal salt or an alkali earth metal salt (except for a compound corresponding to the metal salt shown in Chemical formula 1), higher effect is able to be obtained.

Further, when the anode active material layer 2 has the plurality of anode active material particles, and the anode active material layer 2 also has the oxide-containing film or the metal material not being alloyed with the electrode reactant, the cycle characteristics are able to be further improved.

Next, a description will be given of usage examples of the foregoing anode. A battery will be described as an example of an electrochemical device. The anode is used for the battery as follows.

First Battery

Figure 6:
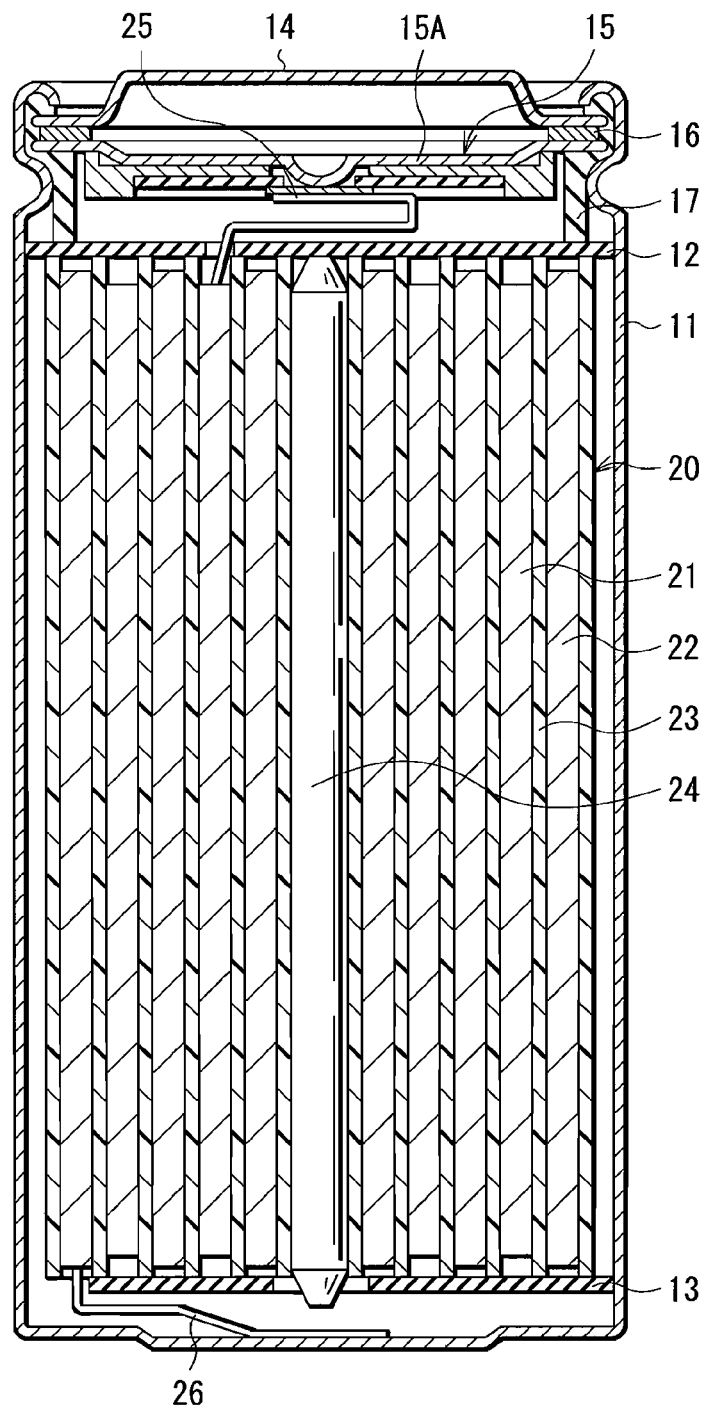
FIG. 6 is a cross sectional view showing a structure of a first battery including the anode according to the embodiment of the invention.
Figure 7:
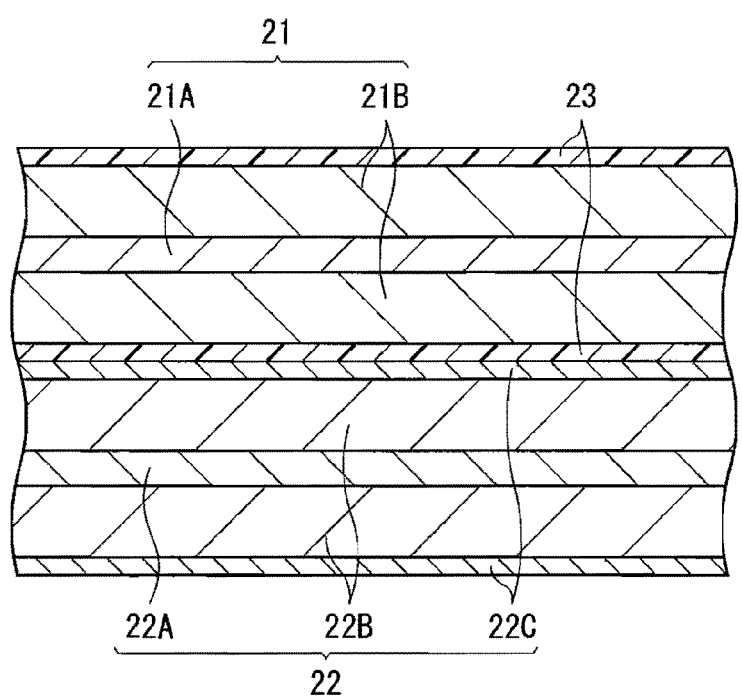
FIG. 7 is a cross sectional view showing an enlarged part of a spirally wound electrode body shown in FIG. 6.

FIG. 6 and FIG. 7 show cross sectional structures of a first battery. FIG. 7 shows an enlarged part of a spirally wound electrode body 20 shown in FIG. 6. The battery herein described is, for example, a lithium ion secondary battery in which the capacity of an anode 22 is expressed based on insertion and extraction of lithium as an electrode reactant.

The secondary battery mainly contains the spirally wound electrode body 20 in which a cathode 21 and the anode 22 are spirally wound with a separator 23 in between, and a pair of insulating plates 12 and 13 inside a battery can 11 in the shape of an approximately hollow cylinder. The battery structure including the battery can 11 is so-called cylindrical type.

The battery can 11 is made of, for example, a metal material such as iron, aluminum, and an alloy thereof. One end thereof is closed and the other end thereof is opened. The pair of insulating plates 12 and 13 is arranged to sandwich the spirally wound electrode body 20 in between and to extend perpendicularly to the spirally wound periphery face.

At the open end of the battery can 11, a battery cover 14, and a safety valve mechanism 15 and a PTC (Positive Temperature Coefficient) device 16 provided inside the battery cover 14 are attached by being caulked with a gasket 17. Inside of the battery can 11 is thereby hermetically sealed. The battery cover 14 is made of, for example, a material similar to that of the battery can 11. The safety valve mechanism 15 is electrically connected to the battery cover 14 with the PTC device 16 in between. In the safety valve mechanism 15, in the case where the internal pressure of the battery becomes a certain level or more by internal short circuit, external heating or the like, a disk plate 15A flips to cut the electric connection between the battery cover 14 and the spirally wound electrode body 20. As temperature rises, the PTC device 16 increases the resistance according to increased temperature and thereby limits a current to prevent abnormal heat generation resulting from a large current. The gasket 17 is made of, for example, an insulating material and its surface is coated with asphalt.

A center pin 24 may be inserted in the center of the spirally wound electrode body 20. In the spirally wound electrode body 20, a cathode lead 25 made of a metal material such as aluminum is connected to the cathode 21, and an anode lead 26 made of a metal material such as nickel is connected to the anode 22. The cathode lead 25 is electrically connected to the battery cover 14 by being welded to the safety valve mechanism 15. The anode lead 26 is electrically connected to the battery can 11 by being welded to the battery can 11.

The cathode 21 has a structure in which, for example, a cathode active material layer 21B is provided on the both faces of a cathode current collector 21A having a pair of faces. The cathode current collector 21A is made of, for example, a metal material such as aluminum, nickel, and stainless. The cathode active material layer 21B contains a cathode active material. If necessary, the cathode active material layer 21B may contain other material such as a binder and an electrical conductor.

The cathode active material contains one or more cathode materials capable of inserting and extracting lithium as an electrode reactant. As the cathode material, for example, a lithium-containing compound is preferable, since thereby a high energy density is obtained. As the lithium-containing compound, for example, a complex oxide containing lithium and a transition metal element or a phosphate compound containing lithium and a transition metal element are cited. Specially, a compound containing at least one selected from the group consisting of cobalt, nickel, manganese, and iron as a transition metal element is preferable, since thereby a higher voltage is able to be obtained. The chemical formula thereof is expressed as, for example, $Li_xM1O_2$ or $Li_yM2PO_4$. In the formula, M1 and M2 represent one or more transition metal elements. Values of x and y vary according to the charge and discharge state of the battery, and are generally in the range of $0.05 \leq x \leq 1.10$ and $0.05 \leq y \leq 1.10$.

As the complex oxide containing lithium and a transition metal element, for example, a lithium cobalt complex oxide ($Li_xCoO_2$), a lithium nickel complex oxide ($Li_xNiO_2$), a lithium nickel cobalt complex oxide ($Li_xNi_{(1-z)}Co_zO_2$ (z<1)), a lithium nickel cobalt manganese complex oxide ($Li_xNi_{(1-v-w)}Co_vMn_wO_2$) (v+w<1)), lithium manganese complex oxide having a spinel structure ($LiMn_2O_4$) and the like are cited. Specially, a complex oxide containing cobalt is preferable, since thereby a high capacity is obtained and superior cycle characteristics are obtained. Further, as the phosphate compound containing lithium and a transition metal element, for example, lithium iron phosphate compound ($LiFePO_4$), a lithium iron manganese phosphate compound ($LiFe_{(1-u)}Mn_uPO_4$ (u<1)) and the like are cited.

In addition, as the cathode material, for example, an oxide such as titanium oxide, vanadium oxide, and manganese dioxide; a disulfide such as titanium disulfide and molybdenum sulfide; a chalcogenide such as niobium selenide; sulfur; a conductive polymer such as polyaniline and polythiophene are cited.

The anode 22 has a structure similar to that of the foregoing anode. For example, the anode 22 has a structure in which an anode active material layer 22B and a coat 22C are provided on the both faces of an anode current collector 22A having a pair of opposed faces. Structures of the anode current collector 22A, the anode active material layer 22B, and the coat 22C are respectively similar to the foregoing structures of the anode current collector 1, the anode active material layer 2, and the coat 3. In the anode 22, the charge capacity of the anode material capable of inserting and extracting lithium is preferably larger than the charge capacity of the cathode 21.

The separator 23 separates the cathode 21 from the anode 22, and passes electrode reactant ions while preventing current short circuit due to contact of the both electrodes. The separator 23 is made of, for example, a porous film made of a synthetic resin such as polytetrafluoroethylene, polypropylene, and polyethylene, or a ceramic porous film. The separator 23 may have a structure in which two or more porous films as the foregoing porous films are layered.

An electrolytic solution as a liquid electrolyte is impregnated in the separator 23. The electrolytic solution contains a solvent and an electrolyte salt dissolved in the solvent.

The solvent contains, for example, one or more nonaqueous solvents such as an organic solvent. The nonaqueous solvents include, for example, an ester carbonate solvent such as ethylene carbonate, propylene carbonate, butylene carbonate, dimethyl carbonate, diethyl carbonate, ethyl methyl carbonate, and methyl propyl carbonate. Thereby, superior capacity characteristics, superior cycle characteristics, and superior storage characteristics are obtained. Specially, a mixture of a high viscosity solvent such as ethylene carbonate and propylene carbonate and a low viscosity solvent such as dimethyl carbonate, ethyl methyl carbonate, and diethyl carbonate is preferable. Thereby, the dissociation characteristics of the electrolyte salt and the ion mobility are improved, and thus higher effect is obtained.

The solvent preferably contains at least one of a chain ester carbonate having halogen as an element shown in Chemical formula 15 and a cyclic ester carbonate having halogen as an element shown in Chemical formula 16. Thereby, a stable protective film (coat) is formed on the surface of the anode 22 and decomposition reaction of the electrolytic solution is prevented, and thus the cycle characteristics are improved.

Chemical formula 15

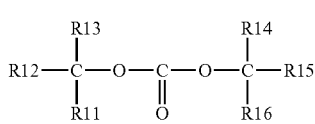

In the formula, R11 to R16 are a hydrogen group, a halogen group, an alkyl group, or an alkyl halide group. At least one thereof is a halogen group or an alkyl halide group.

Chemical formula 16

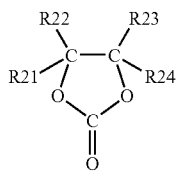

In the formula, R21 to R24 are a hydrogen group, a halogen group, an alkyl group, or an alkyl halide group. At least one thereof is a halogen group or an alkyl halide group.

R11 to R16 in Chemical formula 15 may be identical or different. The same is applied to R21 to R24 in Chemical formula 16. "Alkyl halide group" described for R11 to R14 and R21 to R24 is a group obtained by substituting at least partial hydrogen out of an alkyl group with halogen. The halogen type is not particularly limited, but for example, at least one selected from the group consisting of fluorine, chlorine, and bromine is cited. Specially, fluorine is preferable, since thereby higher effect is obtained. It is needless to say that other halogen may be used.

The number of halogen is more preferably two than one, and further may be three or more, since thereby an ability to form the protective film becomes high, and more rigid and stable protective film is formed. Accordingly, decomposition reaction of the electrolytic solution is further prevented.

As the chain ester carbonate having halogen shown in Chemical formula 15, for example, fluoromethyl methyl carbonate, bis(fluoromethyl) carbonate, difluoromethyl methyl carbonate and the like are cited. One thereof may be used singly, or a plurality thereof may be used by mixture.

As the cyclic ester carbonate having halogen shown in Chemical formula 16, for example, the compounds shown in Chemical formula 17 and Chemical formula 18 are cited. That is, 4-fluoro-1,3-dioxolane-2-one of Chemical formula 17(1), 4-chloro-1,3-dioxolane-2-one of Chemical formula 17(2), 4,5-difluoro-1,3-dioxolane-2-one of Chemical formula 17(3), tetrafluoro-1,3-dioxolane-2-one of Chemical formula 17(4), 4-fluoro-5-chloro-1,3-dioxolane-2-one of Chemical formula 17(5), 4,5-dichloro-1,3-dioxolane-2-one of Chemical formula 17(6), tetrachloro-1,3-dioxolane-2-one of Chemical formula 17(7), 4,5-bistrifluoromethyl-1,3-dioxolane 2-one of Chemical formula 17(8), 4-trifuloromethyl-1,3-dioxolane-2-one of Chemical formula 17(9), 4,5-difluoro-4,5-dimethyl-1,3-dioxolane-2-one of Chemical formula 17(10), 4-methyl-5,5-difluoro-1,3-dioxolane-2-one of Chemical formula 17(11), 4-ethyl-5,5-difluoro-1,3-dioxolane-2-one of Chemical formula 17(12) and the like are cited. Further, 4-trifluoromethyl-5-fluoro-1,3-dioxolane-2-one of Chemical formula 18(1), 4-trifluoromethyl-5-methyl-1,3-dioxolane-2-one of Chemical formula 18(2), 4-fluoro-4,5-dimethyl-1,3-dioxolane-2-one of Chemical formula 18(3), 4,4-difluoro-5-(1,1-difluoroethyl)-1,3-dioxolane-2-one of Chemical formula 18(4), 4,5-dichloro-4,5-dimethyl-1,3-dioxolane-2-one of Chemical formula 18(5), 4-ethyl-5-fluoro-1,3-dioxolane-2-one of Chemical formula 18(6), 4-ethyl-4,5-difluoro-1,3-dioxolane-2-one of Chemical formula 18(7), 4-ethyl-4,5,5-trifluoro-1,3-dioxolane-2-one of Chemical formula 18(8), 4-fluoro-4-methyl-1,3-dioxolane-2-one of Chemical formula 18(9) and the like are cited. One thereof may be used singly, or a plurality thereof may be used by mixture.

Chemical formula 17

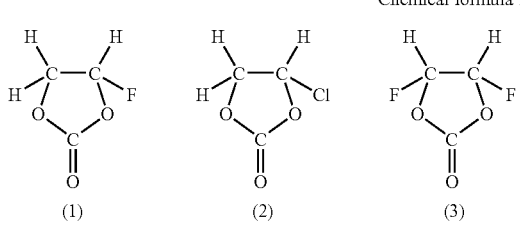

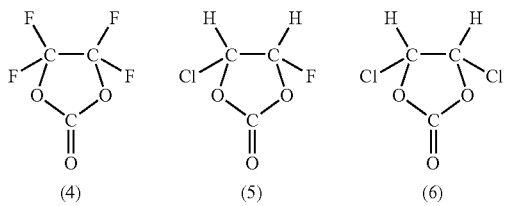

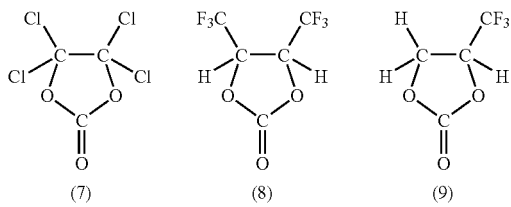

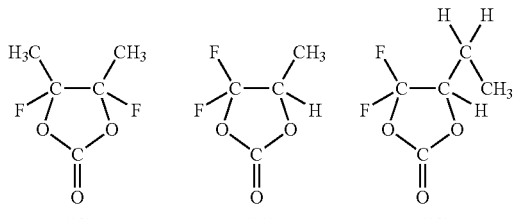

Chemical formula 18

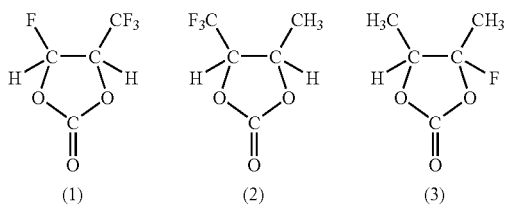

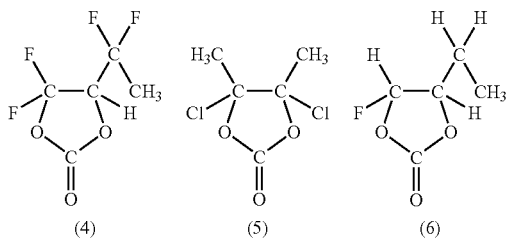

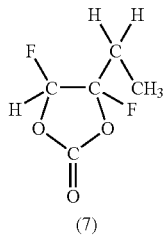
(7)
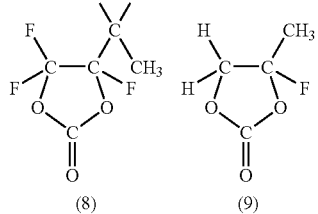
(8) (9)

Specially, 4-fluoro-1,3-dioxolane-2-one or 4,5-difluoro-1,3-dioxolane-2-one is preferable, and 4,5-difluoro-1,3-dioxolane-2-one is more preferable. In particular, as 4,5-difluoro-1,3-dioxolane-2-one, a trans isomer is more preferable than a cis isomer, since the trans isomer is easily available and provides high effect.

Further, the solvent preferably contains a cyclic ester carbonate having an unsaturated bond, since thereby the cycle characteristics are improved. As the cyclic ester carbonate having an unsaturated bond, for example, vinylene carbonate, vinylethylene carbonate and the like are cited. One thereof may be used singly, or a plurality thereof may be used by mixture.

Further, the solvent preferably contains sultone (cyclic sulfonic ester). Thereby, the cycle characteristics are improved, and the swollenness of the secondary battery is prevented. As the sultone, for example, propane sultone, propene sultone and the like are cited. One thereof may be used singly, or a plurality thereof may be used by mixture.

In addition, the solvent preferably contains an acid anhydride, since thereby the cycle characteristics are improved. As the acid anhydride, for example, succinic anhydride, glutaric anhydride, maleic anhydride, sulfobenzoic anhydride, sulfopropionic anhydride, sulfobutyric anhydride, ethane disulfonic anhydride, propane disulfonic anhydride, benzene disulfonic anhydride and the like are cited. One thereof may be used singly, or a plurality thereof may be used by mixture. Specially, sulfobenzoic anhydride or sulfopropionic anhydride is preferable, since thereby sufficient effect is obtained. The content of the acid anhydride in the solvent is, for example, in the range from 0.5 wt % to 3 wt %, both inclusive.

The electrolyte salt contains, for example, one or more light metal salts such as a lithium salt. As the lithium salt, for example, lithium hexafluorophosphate, lithium tetrafluoroborate, lithium perchlorate, lithium hexafluoroarsenate and the like are cited, since thereby superior capacity characteristics, superior cycle characteristics, and superior storage characteristics are obtained. Specially, lithium hexafluorophosphate is preferable, since the internal resistance is lowered, and thus higher effect is obtained.

The electrolyte salt preferably contains at least one selected from the group consisting of the compounds shown in Chemical formula 19 to Chemical formula 21. Thereby, in the case where such a compound is used together with the foregoing lithium hexafluorophosphate or the like, higher effect is obtained. R31 and R33 in Chemical formula 19 may be identical or different. The same is applied to R41 to R43 in Chemical formula 20 and R51 and R52 in Chemical formula 21.

Chemical formula 19

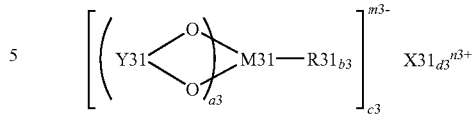

In the formula, X31 is a Group 1A element or a Group 2A element in the short period periodic table or aluminum. M31 is a transition metal, a Group 3B element, a Group 4B element, or a Group 5B element in the short period periodic table. R31 is a halogen group. Y31 is —OC—R32-CO—, —OC—CR33$_2$-, or —OC—CO—. R32 is an alkylene group, an alkylene halide group, an arylene group, or an arylene halide group. R33 is an alkyl group, an alkyl halide group, an aryl group, or an aryl halide group. a3 is one of integer numbers 1 to 4. b3 is one of integer numbers 0, 2, and 4. c3, d3, m3, and n3 are one of integer numbers 1 to 3.

Chemical formula 20

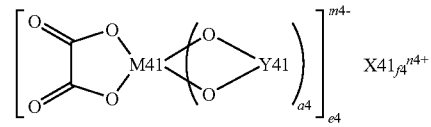

In the formula, X41 is a Group 1A element or a Group 2A element in the short period periodic table. M41 is a transition metal, a Group 3B element, a Group 4B element, or a Group 5B element in the short period periodic table. Y41 is —OC—(CR41$_2$)$_{b4}$-CO—, —R43$_2$C—(CR42$_2$)$_{c4}$-CO—, —R43$_2$C—(CR42$_2$)$_{c4}$-CR43$_2$-, —R43$_2$C—(CR42$_2$)$_{c4}$-SO$_2$—, —O$_2$S—(CR42$_2$)$_{d4}$-SO$_2$—, or —OC—(CR42$_2$)$_{d4}$-SO$_2$—. R41 and R43 are a hydrogen group, an alkyl group, a halogen group, or an alkyl halide group. At least one of R41/R43 is respectively the halogen group or the alkyl halide group. R42 is a hydrogen group, an alkyl group, a halogen group, or an alkyl halide group. a4, e4, and n4 are an integer number of 1 or 2. b4 and d4 are one of integer numbers 1 to 4. c4 is one of integer numbers 0 to 4. f4 and m4 are one of integer numbers 1 to 3.

Chemical formula 21

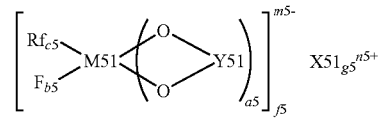

In the formula, X51 is a Group 1A element or a Group 2A element in the short period periodic table. M51 is a transition metal, a Group 3B element, a Group 4B element, or a Group 5B element in the short period periodic table. Rf is a fluorinated alkyl group with the carbon number in the range from 1 to 10 or a fluorinated aryl group with the carbon number in the range from 1 to 10. Y51 is —OC—(CR51$_2$)$_{d5}$-CO—, —(R52)$_2$C—(CR51$_2$)$_{d5}$-CO—, —R52$_2$C—(CR51$_2$)$_{d5}$-CR52$_2$-, —R52$_2$C—(CR51$_2$)$_{d5}$-SO$_2$—, —O$_2$S—(CR51$_2$)$_{e5}$-SO$_2$—, or —OC—(CR51$_2$)$_{e5}$-SO$_2$—. R51 is a hydrogen group, an alkyl group, a halogen group, or an alkyl halide group. R52 is a hydrogen group, an alkyl group, a halogen group, or an alkyl halide group, and at least one thereof is the halogen group or the alkyl halide group. a5, f5, and n5 are an integer number of 1 or 2. b5, c5, and e5 are one of integer numbers 1 to 4. d5 is one of integer numbers 0 to 4. g5 and m5 are one of integer numbers 1 to 3.

As a compound shown in Chemical formula 19, for example, the compounds shown in Chemical formula 22 and the like are cited. As a compound shown in Chemical formula 20, for example, the compounds shown in Chemical formula 23 and the like are cited. As a compound shown in Chemical formula 21, for example, the compound shown in Chemical formula 24 and the like are cited. It is needless to say that the compound is not limited to the compounds shown in Chemical formula 22 to Chemical formula 24, and the compound may be other compound as long as such a compound has the structure shown in Chemical formula 19 to Chemical formula 21.

Chemical formula 22

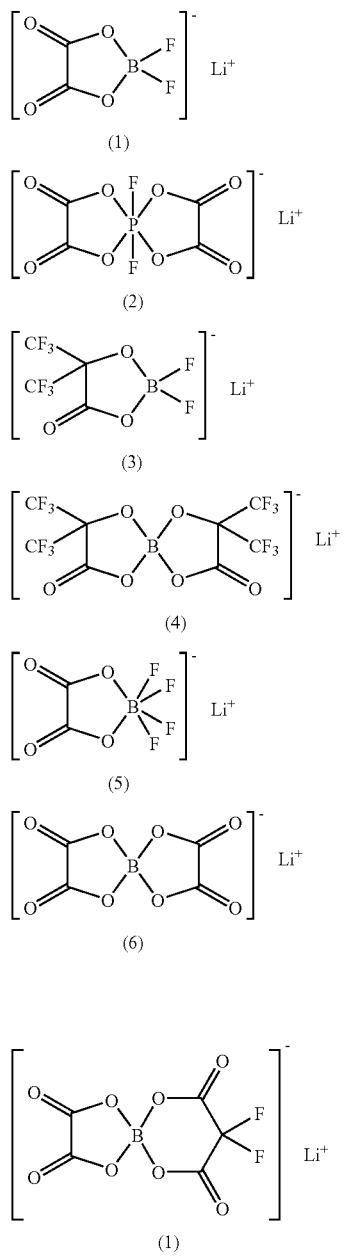

Chemical formula 23

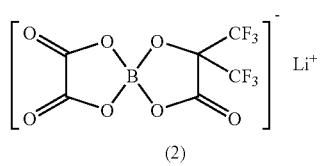

(2)

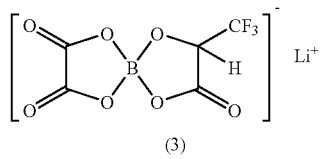

(3)

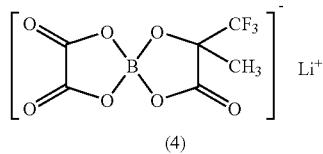

(4)

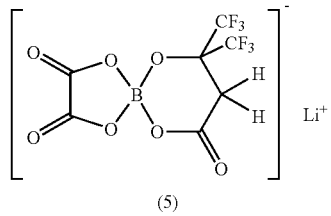

(5)

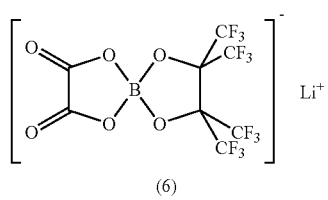

(6)

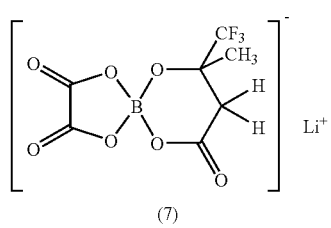

(7)

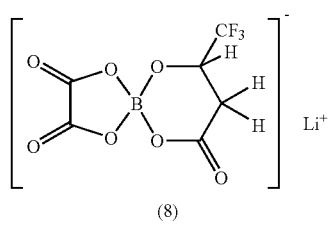

(8)

Chemical formula 24

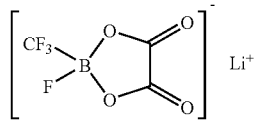

Further, the electrolyte salt may contain at least one selected from the group consisting of the compounds shown in Chemical formula 25 to Chemical formula 27. Thereby, in the case where such a compound is used together with the foregoing lithium hexafluorophosphate or the like, higher effect is obtained. m and n in Chemical formula 25 may be identical or different. The same is applied to p, q, and r in Chemical formula 27.

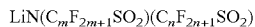

Chemical Formula 25

In the formula, m and n are an integer number of 1 or more.

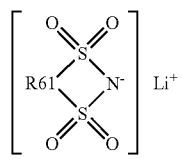

Chemical formula 26

In the formula, R61 is a straight chain/branched perfluoro alkylene group with the carbon number in the range from 2 to 4, both inclusive.

Chemical Formula 27

In the formula, p, q, and r are an integer number of 1 or more.

As the chain compound shown in Chemical formula 25, for example, lithium bis(trifluoromethanesulfonyl)imide (LiN(CF$_3$SO$_2$)$_2$), lithium bis(pentafluoroethanesulfonyl)imide (LiN(C$_2$F$_5$SO$_2$)$_2$), lithium(trifluoromethanesulfonyl)(pentafluoroethanesulfonyl)imide (LiN(CF$_3$SO$_2$) (C$_2$F$_5$SO$_2$)), lithium(trifluoromethanesulfonyl)(heptafluoropropanesulfonyl)imide (LiN(CF$_3$SO$_2$) (C$_3$F$_7$SO$_2$)), lithium(trifluoromethanesulfonyl)(nonafluorobutanesulfonyl)imide (LiN(CF$_3$SO$_2$)(C$_4$F$_9$SO$_2$)) and the like are cited. One thereof may be used singly, or a plurality thereof may be used by mixture.

As the cyclic compound shown in Chemical formula 26, for example, the compounds shown in Chemical formula 28 are cited. That is, lithium 1,2-perfluoroethanedisulfonylimide shown in Chemical formula 28(1), lithium 1,3-perfluoropropanedisulfonylimide shown in Chemical formula 28(2), lithium 1,3-perfluorobutanedisulfonylimide shown in Chemical formula 28(3), lithium 1,4-perfluorobutanedisulfonylimide shown in Chemical formula 28(4) and the like are cited. One thereof may be used singly, or a plurality thereof may be used by mixture. Specially, lithium 1,2-perfluoroethanedisulfonylimide is preferable, since thereby high effect is obtained.

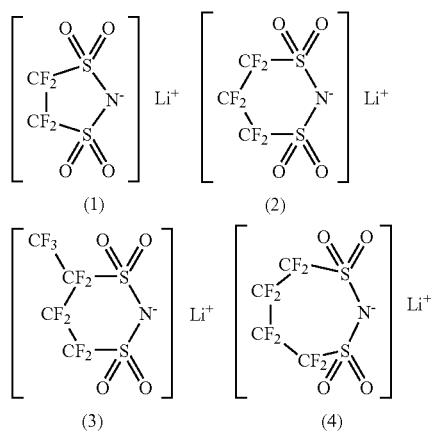

Chemical formula 28

As the chain compound shown in Chemical formula 27, for example, lithium tris(trifluoromethanesulfonyl)methyde (LiC(CF$_3$SO$_2$)$_3$) and the like are cited.

The content of the electrolyte salt to the solvent is preferably in the range from 0.3 mol/kg to 3.0 mol/kg, both inclusive. If out of the foregoing range, there is a possibility that the ion conductivity is significantly lowered.

The secondary battery is manufactured, for example, by the following procedure.

First, the cathode 21 is formed. First, a cathode active material, a binder, and an electrical conductor are mixed to prepare a cathode mixture, which is dispersed in an organic solvent to form paste cathode mixture slurry. Subsequently, the both faces of the cathode current collector 21A are uniformly coated with the cathode mixture slurry by a doctor blade, a bar coater or the like, which is dried. Finally, the coating is compression-molded by a rolling press machine or the like while being heated if necessary to form the cathode active material layer 21B. In this case, the coating may be compression-molded over several times.

Next, the anode 22 is formed by forming the anode active material layer 22B and the coat 22C on the both faces of the anode current collector 22A by a procedure similar to the procedure of forming the foregoing anode.

Next, the spirally wound electrode body 20 is formed by using the cathode 21 and the anode 22. First, the cathode lead 25 is attached to the cathode current collector 21A by welding or the like, and the anode lead 26 is attached to the anode current collector 22A by welding or the like. After that, the cathode 21 and the anode 22 are layered with the separator 23 in between, and spirally wound in the longitudinal direction.

The secondary battery is assembled as follows. First, an end of the cathode lead 25 is welded to the safety valve mechanism 15, and an end of the anode lead 26 is welded to the battery can 11. Subsequently, while the spirally wound electrode body 20 is sandwiched between the pair of insulating plates 12 and 13, the spirally wound electrode body 20 is contained in the battery can 11. Subsequently, the electrolytic solution is injected into the battery can 11, and impregnated in the separator 23. Finally, the battery cover 14, the safety valve mechanism 15, and the PTC device 16 are fixed at the open end section of the battery can 11 by being caulked with the gasket 17. Accordingly, the secondary battery shown in FIG. 6 and FIG. 7 is thereby completed.

In the secondary battery, when charged, for example, lithium ions are extracted from the cathode 21, and are inserted in the anode 22 through the electrolytic solution impregnated in the separator 23. Meanwhile, when discharged, for example, lithium ions are extracted from the anode 22, and are inserted in the cathode 21 through the electrolytic solution impregnated in the separator 23.

According to the cylindrical secondary battery, since the anode 22 has the structure similar to that of the foregoing anode, lithium ions are easily inserted into the anode 22 and extracted from the anode 22, and decomposition of the electrolytic solution is prevented. Accordingly, the cycle characteristics and the swollenness characteristics are able to be improved.

In this case, in the case where the anode 22 contains silicon or the like advantageous to realizing a high capacity (material that is able to insert and extract lithium and that has at least one of a metal element and a metalloid element), the cycle characteristics are improved. Thus, in this case, higher effect is able to be obtained than in the case where the anode 22 contains other anode material such as a carbon material.

Other effect for the secondary battery is similar to that of the foregoing anode.

Second Battery

Figure 8:
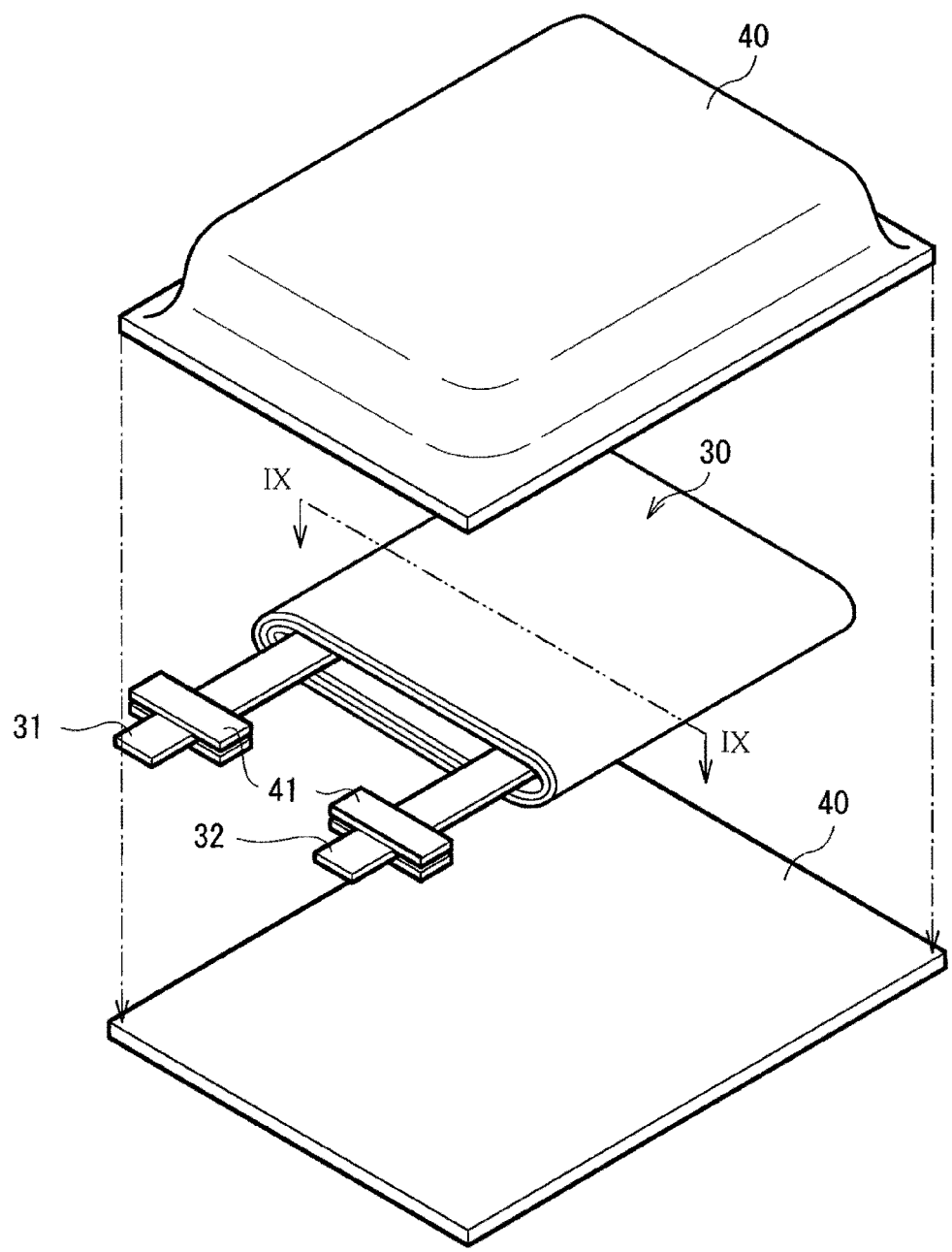
FIG. 8 is a cross sectional view showing a structure of a second battery including the anode according to the embodiment of the invention.
Figure 9:
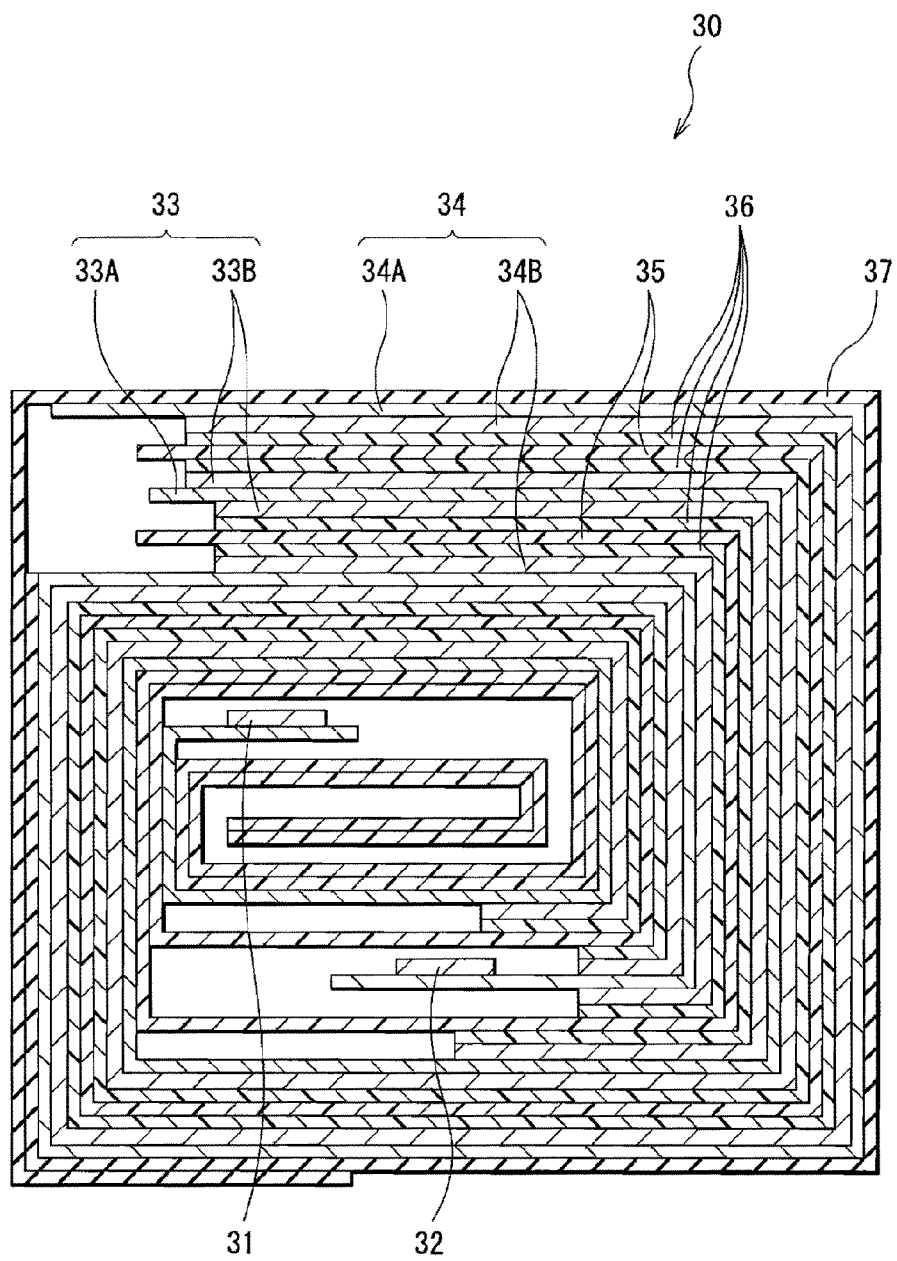
FIG. 9 is a cross sectional view taken along line IX-IX of the spirally wound electrode body shown in FIG. 8.

FIG. 8 shows an exploded perspective structure of a second battery. FIG. 9 shows an enlarged cross section taken along line IX-IX of a spirally wound electrode body 30 shown in FIG. 8. The battery is, for example, a lithium ion secondary battery similar to the foregoing first battery. In the battery, the spirally wound electrode body 30 on which a cathode lead 31 and an anode lead 32 are attached is mainly contained in a film package member 40. The battery structure including the package member 40 is called laminated film structure.

The cathode lead 31 and the anode lead 32 are respectively directed from inside to outside of the package member 40 in the same direction, for example. The cathode lead 31 is made of, for example, a metal material such as aluminum, and the anode lead 32 is made of, for example, a metal material such as copper, nickel, and stainless. The metal materials are in the shape of a thin plate or mesh.

The package member 40 is made of an aluminum laminated film in which, for example, a nylon film, an aluminum foil, and a polyethylene film are bonded together in this order. The package member 40 has, for example, a structure in which the respective outer edges of 2 pieces of rectangle aluminum laminated films are bonded to each other by fusion bonding or an adhesive so that the polyethylene film and the spirally wound electrode body 30 are opposed to each other.

An adhesive film 41 to protect from entering of outside air is inserted between the package member 40 and the cathode lead 31, the anode lead 32. The adhesive film 41 is made of a material having contact characteristics to the cathode lead 31 and the anode lead 32. Examples of such a material include, for example, a polyolefin resin such as polyethylene, polypropylene, modified polyethylene, and modified polypropylene.

The package member 40 may be made of a laminated film having other lamination structure, a polymer film such as polypropylene, or a metal film, instead of the foregoing aluminum laminated film.

In the spirally wound electrode body 30, a cathode 33 and an anode 34 are layered with a separator 35 and an electrolyte 36 in between and then spirally wound. The outermost periphery thereof is protected by a protective tape 37.

Figure 10:
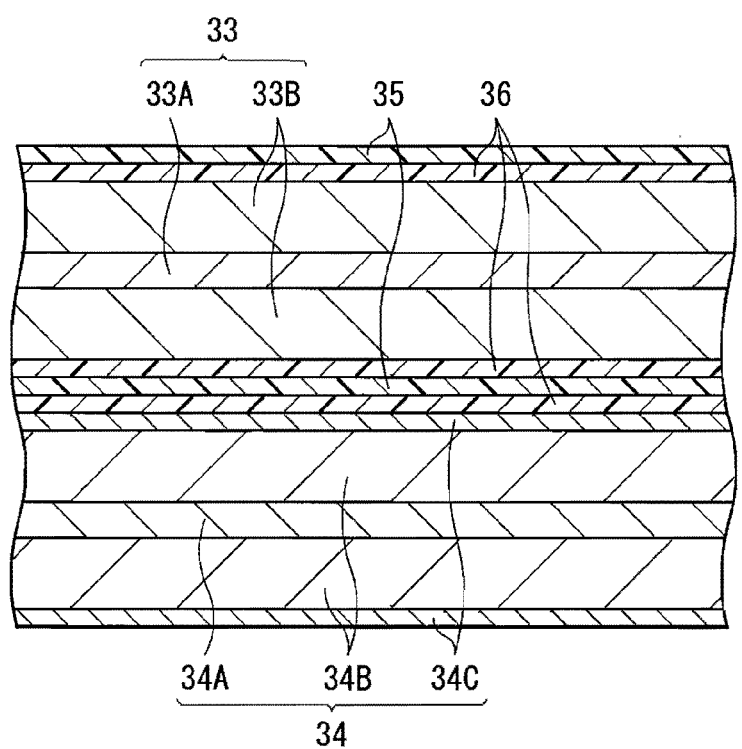
FIG. 10 is a cross sectional view showing an enlarged part of the spirally wound electrode body shown in FIG. 9.

FIG. 10 shows an enlarged part of the spirally wound electrode body 30 shown in FIG. 9. The cathode 33 has a structure in which, for example, a cathode active material layer 33B is provided on the both faces of a cathode current collector 33A having a pair of faces. The anode 34 has a structure similar to that of the foregoing anode, for example, a structure in which an anode active material layer 34B and a coat 34C are provided on the both faces of an anode current collector 34A having a pair of faces. The structures of the cathode current collector 33A, the cathode active material layer 33B, the anode current collector 34A, the anode active material layer 34B, the coat 34C, and the separator 35 are respectively similar to those of the cathode current collector 21A, the cathode active material layer 21B, the anode current collector 22A, the anode active material layer 22B, the coat 22C, and the separator 23 of the foregoing first battery.

The electrolyte 36 is a so-called gel electrolyte, containing an electrolytic solution and a polymer compound that holds the electrolytic solution. The gel electrolyte is preferable, since thereby high ion conductivity (for example, 1 mS/cm or more at room temperature) is obtained and liquid leakage is prevented.

As the polymer compound, for example, polyacrylonitrile, polyvinylidene fluoride, a copolymer of polyvinylidene fluoride and polyhexafluoropylene, polytetrafluoroethylene, polyhexafluoropropylene, polyethylene oxide, polypropylene oxide, polyphosphazene, polysiloxane, polyvinyl acetate, polyvinyl alcohol, polymethylmethacrylate, polyacrylic acid, polymethacrylic acid, styrene-butadiene rubber, nitrile-butadiene rubber, polystyrene, polycarbonate and the like are cited. One of these polymer compounds may be used singly, or a plurality thereof may be used by mixture. Specially, as a polymer compound, polyacrylonitrile, polyvinylidene fluoride, polyhexafluoropropylene, polyethylene oxide and the like are preferably used, since such a compound is electrochemically stable.

The composition of the electrolytic solution is similar to the composition of the electrolytic solution in the first battery. However, in this case, the solvent means a wide concept including not only the liquid solvent but also a solvent having ion conductivity capable of dissociating the electrolyte salt. Therefore, in the case where the polymer compound having ion conductivity is used, the polymer compound is also included in the solvent.

Instead of the gel electrolyte 36 in which the electrolytic solution is held by the polymer compound, the electrolytic solution may be directly used. In this case, the electrolytic solution is impregnated in the separator 35.

The secondary battery including the gel electrolyte 36 is manufactured, for example, by the following three manufacturing methods.

In the first manufacturing method, first, for example, the cathode 33 is formed by forming the cathode active material layer 33B on the both faces of the cathode current collector 33A, and the anode 34 is formed by forming the anode active material layer 34B and the coat 34C on the both faces of the anode current collector 34A by a procedure similar to the procedure of forming the cathode 21 and the anode 22 in the foregoing first battery. Subsequently, a precursor solution containing an electrolytic solution, a polymer compound, and a solvent is prepared. After the cathode 33 and the anode 34 are coated with the precursor solution, the solvent is volatilized to form the gel electrolyte 36. Subsequently, the cathode lead 31 is attached to the cathode 33, and the anode lead 32 is attached to the anode 34. Subsequently, the cathode 33 and the anode 34 provided with the electrolyte 36 are layered with the separator 35 in between to obtain a laminated body. After that, the laminated body is spirally wound in the longitudinal direction, the protective tape 37 is adhered to the outermost periphery thereof to form the spirally wound electrode body 30. Finally, for example, after the spirally wound electrode body 30 is sandwiched between 2 pieces of the film package members 40, outer edges of the package members 40 are contacted by thermal fusion bonding or the like to enclose the spirally wound electrode body 30. At this time, the adhesive films 41 are inserted between the cathode lead 31, the anode lead 32 and the package member 40. Thereby, the secondary battery shown in FIG. 8 to FIG. 10 is completed.

In the second manufacturing method, first, the cathode lead 31 is attached to the cathode 33, and the anode lead 32 is attached to the anode 34. After that, the cathode 33 and the anode 34 are layered with the separator 35 in between and spirally wound. The protective tape 37 is adhered to the outermost periphery thereof, and thereby a spirally wound body as a precursor of the spirally wound electrode body 30 is formed. Subsequently, after the spirally wound body is sandwiched between 2 pieces of the film package members 40, the outermost peripheries except for one side are bonded by thermal fusion bonding or the like to obtain a pouched state, and the spirally wound body is contained in the pouch-like package member 40. Subsequently, a composition of matter for electrolyte containing an electrolytic solution, a monomer as a raw material for the polymer compound, a polymerization initiator, and if necessary other material such as a polymerization inhibitor is prepared, which is injected into the pouch-like package member 40. After that, the opening of the package member 40 is hermetically sealed by thermal fusion bonding or the like. Finally, the monomer is thermally polymerized to obtain a polymer compound. Thereby, the gel electrolyte 36 is formed. Accordingly, the secondary battery is completed.

In the third manufacturing method, the spirally wound body is formed and contained in the pouch-like package member 40 in the same manner as that of the foregoing second manufacturing method, except that the separator 35 with the both faces coated with a polymer compound is used firstly. As the polymer compound with which the separator 35 is coated, for example, a polymer containing vinylidene fluoride as a component, that is, a homopolymer, a copolymer, a multicomponent copolymer and the like are cited. Specifically, polyvinylidene fluoride, a binary copolymer containing vinylidene fluoride and hexafluoropropylene as a component, a ternary copolymer containing vinylidene fluoride, hexafluoropropylene, and chlorotrifluoroethylene as a component and the like are cited. As a polymer compound, in addition to the foregoing polymer containing vinylidene fluoride as a component, another one or more polymer compounds may be contained. Subsequently, an electrolytic solution is prepared and injected into the package member 40. After that, the opening of the package member 40 is sealed by thermal fusion bonding or the like. Finally, the resultant is heated while a weight is applied to the package member 40, and the separator 35 is contacted with the cathode 33 and the anode 34 with the polymer compound in between. Thereby, the electrolytic solution is impregnated into the polymer compound, and the polymer compound is gelated to form the electrolyte 36. Accordingly, the secondary battery is completed.

In the third manufacturing method, the swollenness of the secondary battery is prevented compared to the first manufacturing method. Further, in the third manufacturing method, the monomer, the solvent and the like as a raw material of the polymer compound are hardly left in the electrolyte 36 compared to the second manufacturing method, and the formation step of the polymer compound is favorably controlled. Thus, sufficient contact characteristics are obtained between the cathode 33/the anode 34/the separator 35 and the electrolyte 36.

According to the laminated film secondary battery, the anode 34 has a structure similar to that of the foregoing anode. Thus, the cycle characteristics and the swollenness characteristics are able to be improved. Effect of the secondary battery other than the foregoing effect is similar to that of the first battery.

EXAMPLES

Examples of the invention will be described in detail.

Example 1-1

The laminated film secondary battery shown in FIG. 8 and FIG. 10 was manufactured by the following procedure. The secondary battery was manufactured as a lithium ion secondary battery in which the capacity of the anode 34 was expressed based on insertion and extraction of lithium.

First, the cathode 33 was formed. First, lithium carbonate ($Li_2CO_3$) and cobalt carbonate ($CoCO_3$) were mixed at a molar ratio of 0.5:1. After that, the mixture was fired in the air at 900 deg C. for 5 hours. Thereby, lithium cobalt complex oxide ($LiCoO_2$) was obtained. Subsequently, 91 parts by mass of the lithium cobalt complex oxide as a cathode active material, 6 parts by mass of graphite as an electrical conductor, and 3 parts by mass of polyvinylidene fluoride as a binder were mixed to obtain a cathode mixture. After that, the cathode mixture was dispersed in N-methyl-2-pyrrolidone to obtain paste cathode mixture slurry. Subsequently, the both faces of the cathode current collector 33A made of a strip-shaped aluminum foil (thickness: 12 µm thick) were uniformly coated with the cathode mixture slurry by a bar coater, which was dried. After that, the resultant coating was compression-molded by a roll pressing machine to form the cathode active material layer 33B.

Next, the anode 34 was formed. First, the anode current collector 34A made of an electrolytic copper foil (thickness: 10 µm) was prepared. After that, silicon as an anode active material was deposited on the both faces of the anode current collector 34A by electron beam evaporation method so that the thickness on a single face side became 5 µm to form a plurality of anode active material particles and thereby the anode active material layer 34B was formed. In forming the anode active material layer 34B, the anode active material particles were formed by one deposition step to form a single layer structure. Subsequently, as a solution containing the metal salt shown in Chemical formula 1, 3% aqueous solution in which the metal salt shown in Chemical formula 5(4) was dissolved was prepared. After that, the anode current collector 34A on which the anode active material layer 34B was formed was dipped in the solution for several seconds. Finally, after the anode current collector 34A was taken out from the solution, the resultant was dried in reduced pressure environment at 60 deg C. Accordingly, the coat 34C was formed on the anode active material layer 34B.

Next, after ethylene carbonate (EC) and diethyl carbonate (DEC) were mixed as a solvent, lithium hexafluorophosphate ($LiPF_6$) was dissolved therein as an electrolyte salt to prepare an electrolytic solution. The composition of the solvent (EC: DEC) was 30:70 at a weight ratio. The concentration of the lithium hexafluorophosphate in the electrolytic solution was 1 mol/kg.

Finally, the secondary battery was assembled by using the cathode 33, the anode 34, and the electrolytic solution. First, the cathode lead 31 made of aluminum was welded to one end of the cathode current collector 33A, and the anode lead 32 made of nickel was welded to one end of the anode current collector 34A. Subsequently, the cathode 33, the separator 35 (thickness: 25 µm) made of a microporous polypropylene film, and the anode 34 were layered in this order. Then, the resultant laminated body was spirally wound in the longitudinal direction. After that, the end section of the spirally wound body was fixed by the protective tape 37 made of an adhesive tape, and thereby a spirally wound body as a precursor of the spirally wound electrode body 30 was formed. Subsequently, the spirally wound body was sandwiched between the package members 40 made of a 3-layer laminated film (total thickness: 100 µm) in which a nylon film (thickness: 30 µm), an aluminum foil (thickness: 40 µm), and a non-stretch polypropylene film (thickness 30 µm) were layered from the outside. After that, outer edges other than an edge of one side of the package members were thermally fusion-bonded to each other. Thereby, the spirally wound body was contained in the package members 40 in a pouched state. Subsequently, an electrolytic solution was injected through the opening of the package member 40, the electrolytic solution was impregnated in the separator 35, and thereby the spirally wound electrode body 30 was formed. Finally, the opening of the package member 40 was sealed by thermal fusion bonding in the vacuum atmosphere, and thereby the laminated film secondary battery was completed. For the secondary battery, the thickness of the cathode active material layer 33B was adjusted so that the charge and discharge capacity of the anode 34 was larger than the charge and discharge capacity of the cathode 33, and thereby lithium metal was prevented from being precipitated on the anode 34 in the middle of charge and discharge.

Examples 1-2 to 1-6

A procedure was performed in the same manner as that of Example 1-1, except that the metal salt shown in Chemical formula 5(8) (Example 1-2), Chemical formula 9(3) (Example 1-3), Chemical formula 10(5) (Example 1-4), Chemical formula 10(8) (Example 1-5), or Chemical formula 11(1) (Example 1-6) was used instead of the metal salt shown in Chemical formula 5(4).

Comparative Example 1-1

A procedure was performed in the same manner as that of Example 1-1, except that the coat 34C was not formed.

Comparative Examples 1-2 and 1-3

A procedure was performed in the same manner as that of Example 1-1, except that the metal salt shown in Chemical formula 5(4) (Comparative example 1-2) or Chemical formula 9(3) (Comparative example 1-3) was contained in the electrolytic solution, instead of forming the coat 34C. In containing the metal salt in the electrolytic solution, the metal salt was added so that the content in the electrolytic solution became 0.5 wt %. However, the metal salt was not entirely dissolved, and thus a supernatant solution (saturated solution) was used as an electrolytic solution.

The cycle characteristics and the swollenness characteristics of the secondary batteries of Examples 1-1 to 1-6 and Comparative examples 1-1 to 1-3 were examined. The results shown in Table 1 were obtained.

In examining the cycle characteristics, charge and discharge were performed 2 cycles in the atmosphere of 23 deg C., and thereby the discharge capacity was measured. Subsequently, the secondary battery was charged and discharged in the same atmosphere until the total of the number of cycles became 100 cycles to measure the discharge capacity. After that, the discharge capacity retention ratio (%)=(discharge capacity at the 100th cycle/discharge capacity at the second cycle)×100 was calculated. The charge and discharge condition of 1 cycle was as follows. That is, charge was performed at the constant current density of 1 mA/cm$^2$ until the battery voltage reached 4.2 V, charge was performed at the constant voltage of 4.2 V until the current density reached 0.02 mA/cm$^2$, and then discharge was performed at the constant current density of 1 mA/cm$^2$ until the battery voltage reached 2.5 V In examining the swollenness characteristics, charge and discharge were performed 2 cycles in the atmosphere of 23 deg C., and then charge was performed again to measure the thickness. While being charged continuously, the battery was stored in a constant-temperature bath at 90 deg C. for 4 hours to measure the thickness. After that, swollenness (mm)= (thickness after storage-thickness before storage) was calculated. The charge and discharge condition of 1 cycle was as follows. That is, after charge was performed at the constant current of 0.2 C until the battery voltage reached 4.2 V, discharge was performed at the constant current of 0.2 C until the battery voltage reached 2.5 V. "0.2 C" means the current value with which the theoretical capacity is discharged up in 5 hours.

TABLE 1

Anode active material: silicon (electron beam evaporation method)

| | | Electrolytic solution | | | | Discharge capacity | |
|---|---|---|---|---|---|---|---|
| | Anode | Solvent (wt %) | | Electrolyte salt | | retention ratio | Swollenness |
| | Coat | EC | DEC | (mol/kg) | Others | (%) | (mm) |
| Example 1-1 | Chemical formula 5(4) | 30 | 70 | LiPF$_6$: 1 | — | 63 | 0.136 |
| Example 1-2 | Chemical formula 5(8) | 30 | 70 | | — | 32 | 0.123 |
| Example 1-3 | Chemical formula 9(3) | 30 | 70 | | — | 30 | 0.250 |
| Example 1-4 | Chemical formula 10(5) | 30 | 70 | | — | 42 | 0.156 |
| Example 1-5 | Chemical formula 10(8) | 30 | 70 | | — | 35 | 0.146 |
| Example 1-6 | Chemical formula 11(1) | 30 | 70 | | — | 68 | 0.203 |
| Comparative example 1-1 | — | 30 | 70 | LiPF$_6$: 1 | — | 28 | 0.253 |
| Comparative example 1-2 | — | 30 | 70 | | Chemical formula 5(4) | 29 | 0.254 |
| Comparative example 1-3 | — | 30 | 70 | | Chemical formula 9(3) | 27 | 0.262 |

As shown in Table 1, in Examples 1-1 to 1-6 in which the coat 34C was formed, the discharge capacity retention ratio was higher and the swollenness was smaller compared to those of Comparative example 1-1 in which the coat 34C was not formed. The result showed that in the case where the coat 34C was formed, lithium ions were easily inserted in the anode 34 and easily extracted from the anode 34, and the electrolytic solution was hardly decomposed even if charge and discharge were repeated.

Further, in Comparative examples 1-2 and 1-3 in which the metal salt was contained in the electrolytic solution, the discharge capacity retention ratio and the swollenness were almost the same as those of Comparative example 1-1. Meanwhile, in Examples 1-1 and 1-3 in which the coat 34C containing the metal salt was formed, the discharge capacity retention ratio was higher and the swollenness was smaller compared to those of Comparative examples 1-1 to 1-3. The results showed that in the case where the metal salt was contained in the electrolytic solution, such an event hardly contributed to the discharge capacity retention ratio and the swollenness, but in the case where the metal salt was formed as the coat 34C, such an event was able to contribute to the discharge capacity retention ratio and the swollenness.

Only the results in the case using part of the metal salts shown in Chemical formula 5 to Chemical formula 14 have been herein shown, and results in the case of using the other metal salts have not been shown. However, as evidenced by the results of Table 1, each single metal salt shown in Chemical formula 5(4) or the like plays a roll to increase the discharge capacity retention ratio and decrease the swollenness, and the other metal salts play a similar roll. Thus, it is evident that similar result is obtained in the case where the other metal salts are used. The same is applied to a case where two or more metal salts are used by mixture.

Accordingly, in the secondary battery of the invention, it was confirmed that in the case where the anode active material layer 34B was formed by vapor-phase deposition method and the coat 34C containing the metal salt shown in Chemical formula 1 was formed on the anode active material layer 34B, the cycle characteristics and the swollenness characteristics were improved.

Example 2-1

A procedure was performed in the same manner as that of Example 1-1, except that propylene carbonate (PC) was added as a solvent, and the composition of the solvent (EC:PC:DEC) was changed to 10:20:70 at a weight ratio.

Example 2-2

A procedure was performed in the same manner as that of Example 1-1, except that 4-fluoro-1,3-dioxolane-2-one (FEC) as a cyclic ester carbonate having halogen shown in Chemical formula 16 was added as a solvent instead of EC, and the composition of the solvent (DEC:FEC) was changed to 70:30 at a weight ratio.

Example 2-3

A procedure was performed in the same manner as that of Example 1-1, except that PC and FEC were added as a solvent, and the composition of the solvent (EC:PC:DEC:FEC) was changed to 10:10:70:10 at a weight ratio.

Example 2-4

A procedure was performed in the same manner as that of Example 1-1, except that 4,5-difluoro-1,3-dioxolane-2-one (DFEC) as a cyclic ester carbonate having halogen shown in Chemical formula 16 was added as a solvent, and the composition of the solvent (EC:DEC:DFEC) was changed to 10:70:20 at a weight ratio.

Example 2-5

A procedure was performed in the same manner as that of Example 1-1, except that PC and DFEC were added as a solvent, and the composition of the solvent (EC:PC:DEC:DFEC) was changed to 10:10:70:10 at a weight ratio.

Example 2-6

A procedure was performed in the same manner as that of Example 1-1, except that PC, FEC, and DFEC were added as a solvent instead of EC, and the composition of the solvent (PC:DEC:FEC:DFEC) was changed to 30:50:10:10 at a weight ratio.

Example 2-7

A procedure was performed in the same manner as that of Example 1-1, except that FEC and bis carbonate (fluoromethyl) (DFDMC) as a chain ester carbonate having halogen shown in Chemical formula 15 were added as a solvent instead of EC, and the composition of the solvent (DEC:FEC:DFDMC) was changed to 65:30:5 at a weight ratio.

Examples 2-8 and 2-9

A procedure was performed in the same manner as that of Example 1-1, except that PC and vinylene carbonate (VC) as a cyclic ester carbonate having an unsaturated bond were added as a solvent, and the composition of the solvent (EC:PC:DEC:VC) was changed to 10:19:70:1 at a weight ratio (Example 2-8) or 10:10:70:10 at a weight ratio (Example 2-9).

Comparative Examples 2-1 and 2-2

A procedure was performed in the same manner as that of Examples 2-2 and 2-4, except that the coat 34C was not formed.

The cycle characteristics and the swollenness characteristics of the secondary batteries of Examples 2-1 to 2-9 and Comparative examples 2-1 and 2-2 were examined. The results shown in Table 2 were obtained.

TABLE 2

Anode active material: silicon (electron beam evaporation method)

| | | Electrolytic solution | | | | | | | Discharge capacity | |
| | | Solvent (wt %) | | | | | | Electrolyte salt | retention ratio | Swollenness |
| | Anode Coat | EC | PC | DEC | FEC | DFEC | DFDMC | VC | (mol/kg) | (%) | (mm) |
|---|---|---|---|---|---|---|---|---|---|---|---|
| Example 1-1 | Chemical formula 5(4) | 30 | — | 70 | — | — | — | — | LiPF$_6$: 1 | 63 | 0.136 |
| Example 2-1 | | 10 | 20 | 70 | — | — | — | — | | 65 | 0.128 |
| Example 2-2 | | — | — | 70 | 30 | — | — | — | | 85 | 0.898 |
| Example 2-3 | | 10 | 10 | 70 | 10 | — | — | — | | 82 | 0.863 |
| Example 2-4 | | 10 | — | 70 | — | 20 | — | — | | 87 | 0.873 |
| Example 2-5 | | 10 | 10 | 70 | — | 10 | — | — | | 87 | 0.886 |

TABLE 2-continued

Anode active material: silicon (electron beam evaporation method)

| | Anode Coat | Electrolytic solution Solvent (wt %) | | | | | | | Electrolyte salt (mol/kg) | Discharge capacity retention ratio (%) | Swollenness (mm) |
|---|---|---|---|---|---|---|---|---|---|---|---|
| | | EC | PC | DEC | FEC | DFEC | DFDMC | VC | | | |
| Example 2-6 | — | — | 30 | 50 | 10 | 10 | — | — | | 88 | 0.860 |
| Example 2-7 | — | — | — | 65 | 30 | — | 5 | — | | 87 | 0.875 |
| Example 2-8 | | 10 | 19 | 70 | — | — | — | 1 | | 67 | 0.122 |
| Example 2-9 | | 10 | 10 | 70 | — | — | — | 10 | | 70 | 0.256 |
| Comparative example 1-1 | — | — | 30 | 70 | — | — | — | — | $LiPF_6$: 1 | 28 | 0.253 |
| Comparative example 2-1 | | — | — | 70 | 30 | — | — | — | | 65 | 1.806 |
| Comparative example 2-2 | | 10 | — | 70 | — | 20 | — | — | | 67 | 1.868 |

As shown in Table 2, in the case where PC or the like was added as a solvent, results similar to the results of Table 1 were obtained. That is, in Examples 2-1 to 2-9 in which the coat 34C was formed, the discharge capacity retention ratio was higher and the swollenness was smaller compared to those of Comparative examples 2-1 and 2-2 in which the coat 34C was not formed.

In this case, the following tendency was obtained according to the type of solvent added to the electrolytic solution. First, in Example 2-1 containing PC, the discharge capacity retention ratio was higher and the swollenness was smaller compared to those of Example 1-1 not containing PC. In Examples 2-2 to 2-7 containing FEC, DFEC, or DFDMC, the swollenness was larger but the discharge capacity retention ratio was significantly larger compared to those of Examples 1-1 and 2-1 not containing FEC, DFEC, or DFDMC. In Examples 2-8 and 2-9 containing VC, in the case where the VC content was small, the discharge capacity retention ratio was higher and the swollenness was smaller compared to those of Example 2-1 not containing VC; and in the case where the VC content was larger, the swollenness was larger and the discharge capacity retention ratio was significantly higher compared to those of Example 2-1 not containing VC.

Accordingly, in the secondary battery of the invention, it was confirmed that in the case where the coat 34C containing the metal salt shown in Chemical formula 1 was formed, the cycle characteristics and the swollenness characteristics were improved even if the composition of the solvent in the electrolytic solution was changed.

In this case, it was also confirmed that in the case where propylene carbonate was used as a solvent, the cycle characteristics and the swollenness characteristics were further improved. Further it was also confirmed that in the case where the chain ester carbonate having halogen shown in Chemical formula 15 or the cyclic ester carbonate having halogen shown in Chemical formula 16 was used as a solvent, the cycle characteristics were further improved. Further, it was also confirmed that in the case where the cyclic ester carbonate having an unsaturated bond was used as a solvent, the cycle characteristics or the swollenness characteristics were improved.

Example 3-1

A procedure was performed in the same manner as that of Example 2-2, except that lithium tetrafluoroborate ($LiBF_4$) was added as an electrolyte salt, and the concentration of $LiPF_6$ in the electrolytic solution was 0.9 mol/kg, and the concentration of $LiBF_4$ in the electrolytic solution was 0.1 mol/kg.

Examples 3-2 and 3-3

A procedure was performed in the same manner as that of Example 1-1, except that the compound shown in Chemical formula 22(6) as the compound shown in Chemical formula 19 (Example 3-2) or the compound shown in Chemical formula 23(2) as the compound shown in Chemical formula 20 (Example 3-3) was added as an electrolyte salt, and the concentration of $LiPF_6$ in the electrolytic solution was 0.9 mol/kg, and the concentration of the compound shown in Chemical formula 22(6) or the like in the electrolytic solution was 0.1 mol/kg.

Example 3-4

A procedure was performed in the same manner as that of Example 2-2, except that the compound shown in Chemical formula 28(2) as the compound shown in Chemical formula 26 was added as an electrolyte salt, and the concentration of $LiPF_6$ in the electrolytic solution was 0.9 mol/kg, and the concentration of the compound shown in Chemical formula 28(2) in the electrolytic solution was 0.1 mol/kg.

Examples 3-5 to 3-7

A procedure was performed in the same manner as that of Example 2-2, except that propene sultone as sultone (PRS: Example 3-5), succinic anhydride as an acid anhydride (SCAH: Example 3-6), or sulfobenzoic anhydride (SBAH: Example 3-7) was added into the electrolytic solution. The content of PRS or the like in the electrolytic solution was 1 wt %. "1 wt %" means that where the entire solvent was 100 wt %, PRS or the like was added by the amount corresponding to 1 wt %.

Comparative Example 3

A procedure was performed in the same manner as that of Example 1-1, except that the coat 34C was not formed, and PRS (1 wt %) was added into the electrolytic solution.

For the secondary batteries of Examples 3-1 to 3-7 and Comparative example 3, the cycle characteristics and the swollenness characteristics were examined. The results shown in Table 3 were obtained.

TABLE 3

Anode active material: silicon (electron beam evaporation method)

| | Anode Coat | Solvent (wt %) EC | DEC | FEC | Electrolyte salt (mol/kg) | Others (wt %) | Discharge capacity retention ratio (%) | Swollenness (mm) |
|---|---|---|---|---|---|---|---|---|
| Example 1-1 | Chemical formula 5(4) | 30 | 70 | — | $LiPF_6$: 1 | — | 63 | 0.136 |
| Example 2-2 | | — | 70 | 30 | | — | 85 | 0.898 |
| Example 3-1 | | — | 70 | 30 | $LiPF_6$: 0.9  $LiBF_4$: 0.1 | — | 85 | 0.832 |
| Example 3-2 | | 30 | 70 | — | $LiPF_6$: 0.9  Chemical formula 22(6): 0.1 | — | 64 | 0.128 |
| Example 3-3 | | 30 | 70 | — | $LiPF_6$: 0.9  Chemical formula 23(2): 0.1 | — | 65 | 0.127 |
| Example 3-4 | | — | 70 | 30 | $LiPF_6$: 0.9  Chemical formula 28(2): 0.1 | — | 86 | 0.129 |
| Example 3-5 | | — | 70 | 30 | $LiPF_6$: 1 | PRS: 1 | 85 | 0.883 |
| Example 3-6 | | — | 70 | 30 | | SCAH: 1 | 87 | 0.886 |
| Example 3-7 | | — | 70 | 30 | | SBAH: 1 | 88 | 0.877 |
| Comparative example 1-1 | — | 30 | 70 | — | $LiPF_6$: 1 | — | 28 | 0.253 |
| Comparative example 3 | | 30 | 70 | — | | PRS: 1 | 25 | 0.140 |

As shown in Table 3, in the case where $LiBF_4$ or the like was added as an electrolyte salt, or PRS or the like was added into the electrolytic solution, results similar to the results of Table 1 were obtained. That is, in Examples 3-1 to 3-7 in which the coat 34C was formed, the discharge capacity retention ratio was higher and the swollenness was smaller compared to those of Comparative example 3 in which the coat 34C was not formed.

In this case, in Examples 3-1 to 3-4 in which $LiBF_4$ or the like was contained as an electrolyte salt, the discharge capacity retention ratio tended to be equal to or higher and the swollenness tended to be smaller than that of Examples 1-1 and 2-2 in which $LiBF_4$ or the like was not contained. Further, in Examples 3-5 to 3-7 in which PRS or the like was contained, the discharge capacity retention ratio tended to be equal to or higher and the swollenness tended to be smaller than those of Example 2-2 in which PRS or the like was not contained.

Only the results in the case using the compounds shown in Chemical formulas 19, 20, and 26 as an electrolyte salt have been herein shown. Results in the case using the compounds shown in Chemical formulas 21, 25, and 27 have not been herein shown. However, as evident by the results of Table 3, each single compound shown in Chemical formula 19 and the like plays a roll to increase the discharge capacity retention ratio and decrease the swollenness, and the compound shown in Chemical formula 21 and the like play a similar roll. Thus, it is evident that similar result is obtained in the case where the compound shown in Chemical formula 21 or the like is used. The same is applied to a case where two or more compounds described above are used by mixture.

Accordingly, in the secondary battery of the invention, it was confirmed that in the case where the coat 34C containing the metal salt shown in Chemical formula 1 was formed, the cycle characteristics and the swollenness characteristics were improved even if the type of electrolyte salt in the electrolytic solution was changed or the sultone or the acid anhydride was added into the electrolytic solution.

In this case, it was also confirmed that in the case where as an electrolyte salt, lithium tetrafluoroborate or the compound shown in Chemical formula 19 to chemical formula 21 or Chemical formula 25 to Chemical formula 27 was used, or in the case where sultone or an acid anhydride was added into the electrolytic solution, the cycle characteristics and the swollenness characteristics were further improved.

Example 4-1

A procedure was performed in the same manner as that of Example 2-2, except that magnesium sulfopropionate as an alkali earth metal salt was contained in the coat 34C. In forming the coat 34C, a solution obtained by adding magnesium sulfopropionate to 3% aqueous solution in which the metal salt shown in Chemical formula 5(4) was dissolved was used.

Example 4-2

A procedure was performed in the same manner as that of Example 2-2, except that in forming the anode active material layer 34B, after a plurality of anode active material particles were formed, an oxide of silicon ($SiO_2$) as an oxide-containing film was precipitated on the surface of the anode active material particles by liquid-phase precipitation method. In forming the oxide-containing film, the anode current collector 34A on which the anode active material particles were formed was dipped in a solution obtained by dissolving boron as an anion capture agent in hydrofluosilic acid for three hours, the oxide of silicon was precipitated on the surface of the anode active material particles, and then the resultant was washed and dried under reduced pressure.

Example 4-3

A procedure was performed in the same manner as that of Example 2-2, except that in forming the anode active material layer 34B, after a plurality of anode active material particles were formed, a plating film of cobalt (Co) as a metal material was grown by electrolytic plating method. In forming the metal material, a current was applied while air was supplied to a plating bath to deposit cobalt on the both faces of the anode current collector 34A. As a plating solution, a cobalt plating solution (manufactured by Japan Pure Chemical Co., Ltd.)

was used. The current density was in the range from 2 A/dm² to 5 A/dm², and the plating rate was 10 nm/sec.

Comparative Examples 4-1 and 4-2

A procedure was performed in the same manner as that of Examples 4-2 and 4-3, except that the coat 34C was not formed.

For the secondary batteries of Examples 4-1 to 4-3 and Comparative examples 4-1 and 4-2, the cycle characteristics and the swollenness characteristics were examined. The results shown in Table 4 were obtained.

Accordingly, in the secondary battery of the invention, it was confirmed that in the case where the coat 34C containing the metal salt shown in Chemical formula 1 was formed, the cycle characteristics and the swollenness characteristics were improved even if the alkali earth metal salt or the alkali earth metal salt was contained in the coat 34, or even if the oxide-containing film or the metal material was formed before the coat 34 was formed.

In this case, it was also confirmed that in the case where the alkali metal salt or the alkali earth metal salt was contained in the coat 34, or the oxide-containing film or the metal material was formed before the coat 34C was formed, the cycle char-

TABLE 4

Anode active material: silicon (electron beam evaporation method)

| | Anode | | | Electrolytic solution | | Discharge capacity | |
| --- | --- | --- | --- | --- | --- | --- | --- |
| | Oxide-containing film | Metal material | Coat | Solvent (wt %) DEC | FEC | Electrolyte salt (mol/kg) | retention ratio (%) | Swollenness (mm) |
| Example 2-2 | — | — | Chemical formula 5(4) | 70 | 30 | LiPF$_6$: 1 | 85 | 0.898 |
| Example 4-1 | — | — | Chemical formula 5(4) + magnesium sulfopropionate | 70 | 30 | | 88 | 0.122 |
| Example 4-2 | SiO$_2$ | — | Chemical formula 5(4) | 70 | 30 | | 90 | 0.124 |
| Example 4-3 | SiO$_2$ | Co | Chemical formula 5(4) | 70 | 30 | | 92 | 0.128 |
| Comparative example 2-1 | — | — | — | 70 | 30 | LiPF$_6$: 1 | 65 | 1.806 |
| Comparative example 4-1 | SiO$_2$ | — | — | 70 | 30 | | 88 | 1.235 |
| Comparative example 4-2 | SiO$_2$ | Co | — | 70 | 30 | | 90 | 1.256 |

As shown in Table 4, even if the alkali earth metal salt or the like was contained in the coat 34 or even if the oxide-containing film or the metal material was formed before the coat 34C was formed, results similar to those of Table 1 were obtained. That is, in Examples 4-1 to 4-3 in which the coat 34C was formed, the discharge capacity retention ratio was higher and the swollenness was smaller compared to those of Comparative examples 4-1 and 4-2 in which the coat 34C was not formed.

In this case, in Examples 4-1 to 4-3 in which the alkali earth metal salt or the like was contained in the coat 34 or the oxide-containing film or the metal material was formed before the coat 34C was formed, the discharge capacity retention ratio tended to be higher and the swollenness tended to be smaller than those of Example 2-2 in which the alkali earth metal salt, the oxide-containing film, or the metal material was not contained. In particular, in Example 4-2 in which the oxide-containing film was formed, the discharge capacity retention ratio was higher than that of Example 4-1 in which the alkali earth metal salt was contained in the coat 34C. In Example 4-3 in which the metal material was formed, the discharge capacity retention ratio was still higher.

Only the results in the case where the alkali earth metal salt was contained in the coat 34C have been herein shown, and results in the case where the alkali metal salt was contained have not been shown. However, as evidenced by the results of Table 4, each single alkali earth metal salt plays a roll to increase the discharge capacity retention ratio and decrease the swollenness, and the alkali metal salt plays a similar roll. Thus, it is evident that a similar result is obtained in the case where the alkali metal salt is contained. The same is applied to a case where two or more alkali earth metal salts and alkali metal salts are used by mixture.

acteristics were further improved. The cycle characteristics were improved in the order of the alkali earth metal salt, the oxide-containing film, and the metal material.

Examples 5-1 to 5-6

A procedure was performed in the same manner as that of Examples 1-1 to 1-6, except that the anode active material layer 34B was formed by sintering method instead of vapor-phase deposition method (electron beam evaporation method) so that the thickness of a single face side became 10 μm. In forming the anode active material layer 34B by sintering method, an anode mixture in which 95 parts by mass of silicon as an anode active material (average particle diameter: 1 μm) and 5 parts by mass of polyimide as a binder were mixed was dispersed in N-methyl-2-pyrrolidone to obtain paste cathode mixture slurry. The both faces of the anode current collector 34A made of an electrolytic copper foil (thickness: 18 μm) were uniformly coated with the anode mixture slurry by a bar coater, which was dried. After that, the resultant coating was compression-molded by a roll pressing machine, and the resultant was heated for 12 hours at 400 deg C. in the vacuum atmosphere. In this case, again, the thickness of the cathode active material layer 33B was adjusted so that the charge and discharge capacity of the anode 34 was larger than the charge and discharge capacity of the cathode 33, and thereby lithium metal was prevented from being precipitated on the anode 34 in the middle of charge and discharge.

Comparative Examples 5-1 to 5-3

A procedure was performed in the same manner as that of Examples to 1-3, except that the anode active material layer 34 was formed by sintering method in the same manner as that of Examples 5-1 to 5-6.

For the secondary batteries of Examples 5-1 to 5-6 and Comparative examples 5-1 to 5-3, the cycle characteristics and the swollenness characteristics were examined. The results shown in Table 5 were obtained.

TABLE 5

Anode active material: silicon (sintering method)

| Anode Coat | Solvent (wt %) EC | DEC | Electrolyte salt (mol/kg) | Others | Discharge capacity retention ratio (%) | Swollenness (mm) |
|---|---|---|---|---|---|---|
| Example 5-1 | Chemical formula 5(4) | 30 | 70 | LiPF$_6$: 1 | — | 60 | 0.125 |
| Example 5-2 | Chemical formula 5(8) | 30 | 70 | | — | 28 | 0.115 |
| Example 5-3 | Chemical formula 9(3) | 30 | 70 | | — | 27 | 0.230 |
| Example 5-4 | Chemical formula 10(5) | 30 | 70 | | — | 40 | 0.146 |
| Example 5-5 | Chemical formula 10(8) | 30 | 70 | | — | 32 | 0.126 |
| Example 5-6 | Chemical formula 11(1) | 30 | 70 | | — | 64 | 0.198 |
| Comparative example 5-1 | — | 30 | 70 | LiPF$_6$: 1 | — | 25 | 0.243 |
| Comparative example 5-2 | — | 30 | 70 | | Chemical formula 5(4) | 26 | 0.235 |
| Comparative example 5-3 | — | 30 | 70 | | Chemical formula 9(3) | 26 | 0.256 |

As shown in Table 5, in the case where the anode active material layer 34B was formed by sintering method, the results similar to the results of Table 1 were obtained. That is, in Examples 5-1 to 5-6 in which the coat 34C was formed, the discharge capacity retention ratio was higher and the swollenness was smaller compared to those of Comparative examples 5-1 to 5-3 in which the coat 34C was not formed.

Accordingly, in the secondary battery of the invention, it was confirmed that in the case where the anode active material layer 34B was formed by sintering method and the coat 34C containing the metal salt shown in Chemical formula 1 was formed on the anode active material layer 34B, the cycle characteristics and the swollenness characteristics were improved.

Examples 6-1 to 6-9

A procedure was performed in the same manner as that of Examples 2-1 to 2-9, except that the anode active material layer 34B was formed by sintering method in the same manner as that of Examples 5-1 to 5-6.

Comparative Examples 6-1 and 6-2

A procedure was performed in the same manner as that of Comparative examples 2-1 and 2-2, except that the anode active material layer 34B was formed by sintering method in the same manner as that of Examples 5-1 to 5-6.

The cycle characteristics and the swollenness characteristics of the secondary batteries of Examples 6-1 to 6-9 and Comparative examples 6-1 and 6-2 were examined. The results shown in Table 6 were obtained.

TABLE 6

Anode active material: silicon (sintering method)

| | Anode Coat | Solvent (wt %) | | | | | | Electrolyte salt (mol/kg) | Discharge capacity retention ratio (%) | Swollenness (mm) |
| | | EC | PC | DEC | FEC | DFEC | DFDMC | VC | | | |
|---|---|---|---|---|---|---|---|---|---|---|---|
| Example 5-1 | Chemical formula 5(4) | 30 | — | 70 | — | — | — | — | LiPF$_6$: 1 | 60 | 0.125 |
| Example 6-1 | | 10 | 20 | 70 | — | — | — | — | | 62 | 0.118 |
| Example 6-2 | | — | — | 70 | 30 | — | — | — | | 83 | 0.890 |
| Example 6-3 | | 10 | 10 | 70 | 10 | — | — | — | | 79 | 0.858 |
| Example 6-4 | | 10 | — | 70 | — | 20 | — | — | | 84 | 0.863 |
| Example 6-5 | | 10 | 10 | 70 | — | 10 | — | — | | 84 | 0.853 |
| Example 6-6 | | — | 30 | 50 | 10 | 10 | — | — | | 86 | 0.853 |
| Example 6-7 | | — | — | 65 | 30 | — | 5 | — | | 84 | 0.863 |
| Example 6-8 | | 10 | 19 | 70 | — | — | — | 1 | | 65 | 0.120 |

TABLE 6-continued

Anode active material: silicon (sintering method)

| | Anode Coat | Electrolytic solution | | | | | | | Electrolyte salt (mol/kg) | Discharge capacity retention ratio (%) | Swollenness (mm) |
| --- | --- | --- | --- | --- | --- | --- | --- | --- | --- | --- | --- |
| | | Solvent (wt %) | | | | | | | | | |
| | | EC | PC | DEC | FEC | DFEC | DFDMC | VC | | | |
| Example 6-9 | | 10 | 10 | 70 | — | — | — | 10 | | 69 | 0.245 |
| Comparative example 5-1 | — | 30 | — | 70 | — | — | — | — | LiPF$_6$: 1 | 25 | 0.243 |
| Comparative example 6-1 | | — | — | 70 | 30 | — | — | | | 62 | 1.800 |
| Comparative example 6-2 | | 10 | — | 70 | — | 20 | — | | | 63 | 1.858 |

As shown in Table 6, in the case where the anode active material layer 34B was formed by sintering method, results similar to the results of Table 2 were obtained. That is, in Examples 6-1 to 6-9 in which the coat 34C was formed, the discharge capacity retention ratio was higher and the swollenness was smaller compared to those of Comparative examples 6-1 and 6-2 in which the coat 34C was not formed.

Accordingly, in the secondary battery of the invention, it was confirmed that in the case where the coat 34C containing the metal salt shown in Chemical formula 1 was formed, the cycle characteristics and the swollenness characteristics were improved even if the composition of the solvent in the electrolytic solution was changed.

Examples 7-1 to 7-7

A procedure was performed in the same manner as that of Examples 3-1 to 3-7, except that the anode active material layer 34B was formed by sintering method in the same manner as that of Examples 5-1 to 5-6.

Comparative Example 7

A procedure was performed in the same manner as that of Comparative example 3, except that the anode active material layer 34B was formed by sintering method in the same manner as that of Examples 5-1 to 5-6.

The cycle characteristics and the swollenness characteristics of the secondary batteries of Examples 7-1 to 7-7 and Comparative example 7 were examined. The results shown in Table 7 were obtained.

TABLE 7

Anode active material: silicon (sintering method)

| | Anode Coat | Electrolytic solution | | | Electrolyte salt (mol/kg) | Others (wt %) | Discharge capacity retention ratio (%) | Swollenness (mm) |
| --- | --- | --- | --- | --- | --- | --- | --- | --- |
| | | Solvent (wt %) | | | | | | |
| | | EC | DEC | FEC | | | | |
| Example 5-1 | Chemical formula 5(4) | 30 | 70 | — | LiPF$_6$: 1 | — | 60 | 0.125 |
| Example 6-2 | | — | 70 | 30 | | — | 83 | 0.890 |
| Example 7-1 | | — | 70 | 30 | LiPF$_6$: 0.9 LiBF$_4$: 0.1 | — | 83 | 0.820 |
| Example 7-2 | | 30 | 70 | — | LiPF$_6$: 0.9 Chemical formula 22(6): 0.1 | — | 61 | 0.118 |
| Example 7-3 | | 30 | 70 | — | LiPF$_6$: 0.9 Chemical formula 23(2): 0.1 | — | 63 | 0.117 |
| Example 7-4 | | — | 70 | 30 | LiPF$_6$: 0.9 Chemical formula 28(2): 0.1 | — | 83 | 0.119 |
| Example 7-5 | | — | 70 | 30 | LiPF$_6$: 1 | PRS: 1 | 83 | 0.873 |
| Example 7-6 | | — | 70 | 30 | | SCAH: 1 | 83 | 0.875 |
| Example 7-7 | | — | 70 | 30 | | SBAH: 1 | 86 | 0.850 |
| Comparative example 5-1 | — | 30 | 70 | — | LiPF$_6$: 1 | — | 25 | 0.243 |
| Comparative example 7 | | 30 | 70 | — | | PRS: 1 | 20 | 0.126 |

As shown in Table 7, in the case where the anode active material layer 34B was formed by sintering method, results similar to the results of Table 3 were obtained. That is, in Examples 7-1 to 7-7 in which the coat 34C was formed, the discharge capacity retention ratio was higher and the swollenness was smaller compared to those of Comparative example 7 in which the coat 34C was not formed.

Accordingly, in the secondary battery of the invention, it was confirmed that in the case where the coat 34C containing the metal salt shown in Chemical formula 1 was formed, the cycle characteristics and the swollenness characteristics were improved even if the type of electrolyte salt in the electrolytic solution was changed, or even if the sultone or the acid anhydride was added into the electrolytic solution.

Example 8

A procedure was performed in the same manner as that of Example 4-1, except that the anode active material layer 34B was formed by sintering method in the same manner as that of Examples 5-1 to 5-6.

The cycle characteristics and the swollenness characteristics of the secondary batteries of Example 8 were examined. The results shown in Table 8 were obtained.

TABLE 8

Anode active material: silicon (sintering method)

| | Anode | | | Electrolytic solution | | Discharge capacity | |
|---|---|---|---|---|---|---|---|
| | Oxide-containing film | Metal material | Coat | Solvent (wt %) | | Electrolyte salt (mol/kg) | retention ratio (%) | Swollenness (mm) |
| | | | | DEC | FEC | | | |
| Example 6-2 | — | — | Chemical formula 5(4) | 70 | 30 | LiPF$_6$: 1 | 83 | 0.890 |
| Example 8 | — | — | Chemical formula 5(4) + magnesium sulfopropionate | 70 | 30 | | 86 | 0.115 |
| Comparative example 6-1 | — | — | — | 70 | 30 | LiPF$_6$: 1 | 62 | 1.800 |

As shown in Table 8, in the case where the anode active material layer 34B was formed by sintering method, results similar to the results of Table 4 were obtained. That is, in Example 8 in which the coat 34C was formed, the discharge capacity retention ratio was higher and the swollenness was smaller compared to those of Comparative example 6-1 in which the coat 34C was not formed, and the discharge capacity retention ratio was higher and the swollenness was smaller compared to those of Comparative example 6-2 in which the coat 34C was formed.

Accordingly, in the secondary battery of the invention, it was confirmed that in the case where the coat 34C containing the metal salt shown in Chemical formula 1 was formed, the cycle characteristics and the swollenness characteristics were improved even if the alkali metal salt or the alkali earth metal salt was contained in the coat 34.

As evidenced by the results of Table 1 to Table 8, in the secondary battery of the invention, it was confirmed that in the case where the coat containing the metal salt shown in Chemical formula 1 was formed on the anode active material layer, the cycle characteristics and the swollenness characteristics were improved without depending on the composition of the solvent in the electrolytic solution, the method of forming the anode active material layer or the like.

The invention has been described with reference to the embodiment and the examples. However, the invention is not limited to the aspects described in the foregoing embodiment and the foregoing examples, and various modifications may be made. For example, usage applications of the anode of the invention are not limited to the battery, but may include electrochemical devices other than the battery. As other usage application, for example, a capacitor and the like are cited.

Further, in the foregoing embodiment and the foregoing examples, the description has been given of the lithium ion secondary battery in which the anode capacity is expressed based on insertion and extraction of lithium as a battery type. However, the battery of the invention is not limited thereto. The invention is similarly applicable to a secondary battery in which the anode capacity includes the capacity associated with insertion and extraction of lithium and the capacity associated with precipitation and dissolution of lithium, and the anode capacity is expressed by the sum of these capacities, by setting the charge capacity of the anode material capable of inserting and extracting lithium to a smaller value than that of the charge capacity of the cathode, in the case where the anode contains an anode material capable of inserting and extracting lithium.

Further, in the foregoing embodiment and the foregoing examples, the description has been given of the case using the electrolytic solution or the gel electrolyte in which an electrolytic solution is held by a polymer compound as an electrolyte of the battery of the invention. However, other type of electrolyte may be used. As other electrolyte, for example, a mixture obtained by mixing an ion conductive inorganic compound such as ion conductive ceramics, ion conductive glass, and ionic crystal and an electrolytic solution; a mixture obtained by mixing other inorganic compound and an electrolytic solution; a mixture of the foregoing inorganic compound and a gel electrolyte and the like are cited.

Further, in the foregoing embodiment and the foregoing examples, the description has been given with the specific examples of the cylindrical or laminated film secondary battery as a battery structure, and with the specific example in which the battery element has the spirally wound structure as a battery structure. However, the battery of the invention is similarly applicable to a battery having other structure such as a square battery, a coin type battery, and a button type battery or a battery in which the battery element has other structure such as a lamination structure.

Further, in the foregoing embodiment and the foregoing examples, the description has been given of the case using lithium as an electrode reactant. However, as an electrode reactant, other Group 1A element such as sodium and potassium (K), a Group 2A element such as magnesium and calcium, or other light metal such as aluminum may be used. In this case, the anode material described in the foregoing embodiment is able to be used as an anode active material as well.

It should be understood by those skilled in the art that various modifications, combinations, sub-combinations and alternations may occur depending on design requirements and other factors insofar as they are within the scope of the appended claims or the equivalents thereof.

What is claimed is:

1. An anode comprising:
   an anode current collector;
   an anode active material layer on the current collector, and
   a coat on the anode active material layer, wherein,
the coat contains a metal salt as set forth in Chemical formula 1:

Chemical formula 1:

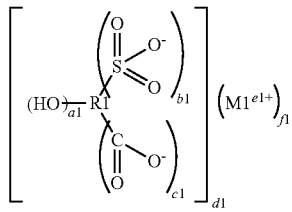

where R1 is a (a1+b1+c1) valent group, M1 is a metal element, each of a1, d1, e1, and f1 are an integer number of 1 or more, and b1 is an integer number of 1 or more, and c1 is an integer number of 0 or more, where (b1+c1)≥1.

2. The anode according to claim 1, wherein R1 in Chemical formula 1 is a chain saturated hydrocarbon group, a chain unsaturated hydrocarbon group, a cyclic saturated hydrocarbon group, a cyclic unsaturated hydrocarbon group, or a halogenated group thereof.

3. The anode according to claim 1, wherein M1 in Chemical formula 1 is an alkali metal element or an alkali earth metal element.

4. The anode according to claim 1, wherein the metal salt of Chemical formula 1 is a metal salt shown in Chemical formula 2:

Chemical formula 2

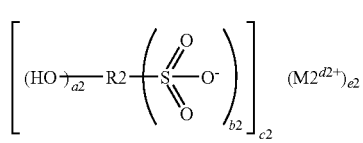

where R2 is a (a2+b2) valent group, M2 is a metal element, and each of a2, b2, c2, d2, and e2 are an integer number of 1 or more.

5. A method of manufacturing a battery comprising the steps of:
providing a cathode;
providing an anode including an anode active material layer and an anode current collector;
providing a coat on the anode active material layer, wherein,
the coat is formed on the anode active material layer with the use of a solution containing a metal salt set forth in Chemical formula 23:

Chemical formula 23

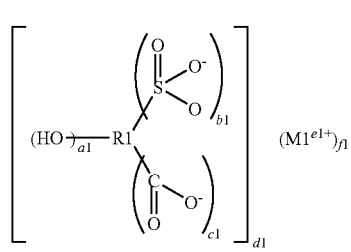

where R1 is a (a1+b1+c1) valent group, M1 is a metal element, a1, d1, e1, and f1 are an integer number of 1 or more, and b1 is an integer of 1 or more and c1 is an integer number of 0 or more, where (b1+c1)≥1.

6. The anode according to claim 4, wherein the metal salt of Chemical formula 2 is at least one of metal salts of Chemical formula 4:

Chemical formula 4

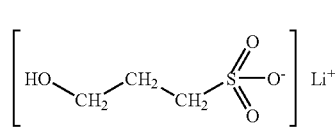

(1)

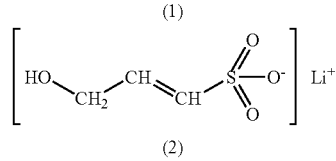

(2)

7. The method of manufacturing a battery according to claim 5 further comprising the step of:
dipping the anode active material layer in the solution containing the metal salt of Chemical formula 23, or
coating the anode active material layer with the solution containing the metal salt of Chemical formula 23.

8. The anode according to claim 1, wherein the coat further comprises at least one of an alkali metal salt and an alkali earth metal salt which are different from a compound corresponding to the metal salt of Chemical formula 1.

9. The anode according to claim 1, wherein the anode active material layer contains an anode active material containing at least one of a simple substance of silicon (Si), an alloy of silicon, a compound of silicon, a simple substance of tin (Sn), an alloy of tin, and a compound of tin.

10. The anode according to claim 1, wherein the anode active material layer has a plurality of anode active material particles, and has an oxide-containing film covering a surface of the anode active material particles.

11. The anode according to claim 10, wherein the oxide-containing film contains an oxide of at least one of silicon, germanium (Ge), and tin.

12. The anode according to claim 1, wherein the anode active material layer has a plurality of anode active material particles, and has a metal material not being alloyed with an electrode reactant in a gap between the anode active material particles.

13. The anode according to claim 12, wherein the anode active material particles have a multilayer structure in the particles, and the anode active material layer has the metal material in a gap in the anode active material particles.

14. The anode according to claim 12, wherein the metal material is at least one of iron (Fe), cobalt (Co), nickel (Ni), zinc (Zn), and copper (Cu).

15. A method of manufacturing an anode comprising the steps of:
providing an anode current collector;
providing an anode active material layer on the anode current collector; and
providing a coat on the anode active material layer, wherein,
the coat is formed on the anode active material layer with the use of a solution containing a metal salt as set forth in Chemical formula 6:

Chemical formula 6

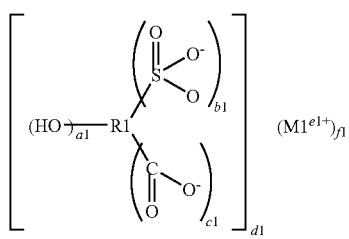

where R1 is a (a1+b1+c1) valent group, M1 is a metal element, each of a1, d1, e1, and f1 are an integer number of 1 or more, and b1 is an integer number of 1 or more, and c1 is an integer number of 0 or more, where (b1+c1)≥1.

16. The method of manufacturing an anode according to claim 15, further comprising the step of:
dipping the anode active material layer in the solution containing the metal salt of Chemical formula 6, or
coating the anode active material layer with the solution containing the metal salt of Chemical formula 6.

17. The method of manufacturing an anode according to claim 15, wherein the solution containing the metal salt of Chemical formula 6 contains at least one of an alkali metal salt and an alkali earth metal salt which are different from a compound corresponding to the metal salt of Chemical formula 6.

18. A battery comprising:
a cathode;
an anode; and
an electrolytic solution,
wherein,
the anode comprises an anode current collector, an anode active material on the anode current collector and a coat on the anode active material layer, and
the coat contains a metal as set forth in Chemical formula 7:

Chemical formula 7

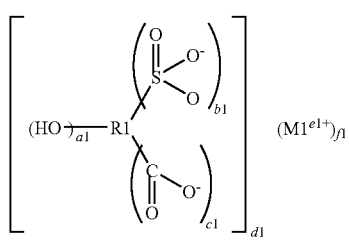

where R1 is a (a1+b1+c1) valent group, M1 is a metal element, each of a1, d1, e1, and f1 are an integer number of 1 or more and b1 is an integer of 1 or more and c1 is an integer number of 0 or more, where (b1+c1)≥1.

19. The battery according to claim 18, wherein R1 in Chemical formula 7 is a chain saturated hydrocarbon group, a chain unsaturated hydrocarbon group, a cyclic saturated hydrocarbon group, a cyclic unsaturated hydrocarbon group, or a halogenated group thereof.

20. The battery according to claim 18, wherein M1 in Chemical formula 7 is an alkali metal element or an alkali earth metal element.

21. The battery according to claim 18, wherein the metal salt shown in the Chemical formula 7 is a metal salt as set forth in Chemical formula 8:

Chemical formula 8

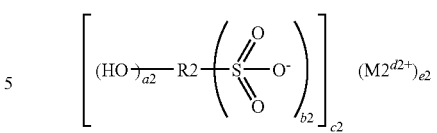

where R2 is a (a2+b2) valent group, M2 is a metal element, and a2, b2, c2, d2, and e2 are an integer number of 1 or more.

22. The method of manufacturing a battery according to claim 5, wherein the solution containing the metal salt of Chemical formula 23 contains at least one of an alkali metal salt and an alkali earth metal salt each of which are different from a compound corresponding to the metal salt of Chemical formula 23.

23. The battery according to claim 21, wherein the metal salt of Chemical formula 8 is at least one of metal salts of Chemical formula 10

Chemical formula 10

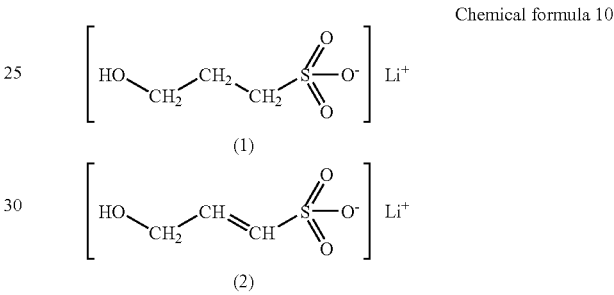

24. The battery according to claim 18, wherein the electrolytic solution contains an electrolyte salt containing at least one selected from the group consisting of compounds set forth in Chemical formula 20 to Chemical formula 22, chemical formulae 20-22 being:

LiN(C$_m$F$_{2m+1}$SO$_2$)(C$_n$F$_{2n+1}$SO$_2$)  Chemical formula 20 where m and n are an integer number of 1 or more;

Chemical formula 21

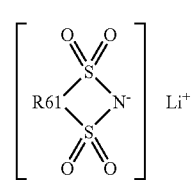

where R61 is a straight chain or branched perfluoro alkylene group with the carbon number in the range from 2 to 4, both inclusive; and LiC(C$_p$F$_{2p+1}$SO$_2$)(C$_q$F$_{2q+1}$SO$_2$)(C$_r$F$_{2r+1}$SO$_2$)  Chemical formula 22 where p, q, and r are an integer number of 1 or more.

25. The battery according to claim 18, wherein the coat contains at least one of an alkali metal salt and an alkali earth metal salt each of which are different from a compound corresponding to the metal salt shown in the Chemical formula 7.

26. The battery according to claim 18, wherein the anode active material layer contains an anode active material containing at least one of a simple substance of silicon, an alloy of silicon, a compound of silicon, a simple substance of tin, an alloy of tin, and a compound of tin.

27. The battery according to claim 18, wherein the anode active material layer has a plurality of anode active material particles, and has an oxide-containing film covering a surface of the anode active material particles.

28. The battery according to claim 27, wherein the oxide-containing film contains an oxide of at least one of silicon, germanium, and tin.

29. The battery according to claim 18, wherein the anode active material layer has a plurality of anode active material particles, and has a metal material not being alloyed with an electrode reactant in a gap between the anode active material particles.

30. The battery according to claim 29, wherein the anode active material particles have a multilayer structure in the particles, and the anode active material layer has the metal material in a gap in the anode active material particles.

31. The battery according to claim 29, wherein the metal material is at least one of iron, cobalt, nickel, zinc, and copper.

32. The battery according to claim 18, wherein the electrolytic solution contains a solvent containing cyclic ester carbonate having an unsaturated bond.

33. The battery according to claim 18, wherein the electrolytic solution contains a solvent containing at least one of a chain ester carbonate having halogen as set forth in Chemical formula 12 and a cyclic ester carbonate having halogen as set forth in Chemical formula 13, chemical formulae 12 and 13 being:

Chemical formula 12

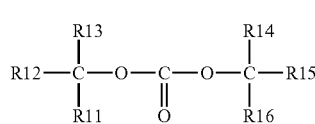

where each of R11 to R16 represent a hydrogen group, a halogen group, an alkyl group, or an alkyl halide group, and at least one thereof is a halogen group or an alkyl halide group, and Chemical formula 13

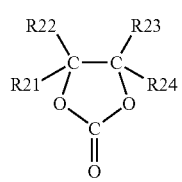

where each of R21 to R24 represent a hydrogen group, a halogen group, an alkyl group, or an alkyl halide group, and at least one thereof is a halogen group or an alkyl halide group.

34. The battery according to claim 33, wherein:
the chain ester carbonate having halogen of Chemical formula 12 is at least one of fluoromethyl methyl carbonate, difluoromethyl methyl carbonate, and bis(fluoromethyl) carbonate, and
the cyclic ester carbonate having halogen of Chemical formula 13 is at least one of 4-fluoro-1,3-dioxolane-2-one and 4,5-difluoro-1,3-dioxolane-2-one.

35. The battery according to claim 18, wherein the electrolytic solution contains a solvent containing sultone.

36. The battery according to claim 18, wherein the electrolytic solution contains a solvent containing an acid anhydride.

37. The battery according to claim 18, wherein the electrolytic solution contains an electrolyte salt containing at least one of lithium hexafluorophosphate ($LiPF_6$), lithium tetrafluoroborate ($LiBF_4$), lithium perchlorate ($LiClO_4$), and lithium hexafluoroarsenate ($LiAsF_6$).

38. The battery according to claim 18, wherein the electrolytic solution contains an electrolyte salt containing at least one of compounds as set forth in Chemical formula 14 to Chemical formula 16, chemical formulae 14-16 being:

Chemical formula 14

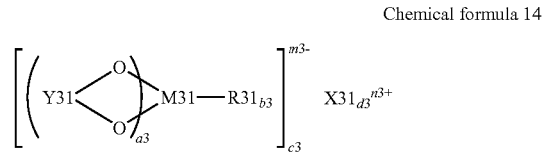

where X31 represents a Group 1A element or a Group 2A element in the short period periodic table or aluminum (Al), M31 represents a transition metal, a Group 3B element, a Group 4B element, or a Group 5B element in the short period periodic table, R31 represents a halogen group, Y31 represents —OC—R32-CO—, —OC—CR33$_2$-, or —OC—CO—, R32 is an alkylene group, an alkylene halide group, an arylene group, or an arylene halide group, R33 represents an alkyl group, an alkyl halide group, an aryl group, or an aryl halide group, a3 is one of integer numbers 1 to 4, b3 is one of integer numbers 0, 2, and 4, and c3, d3, m3, and n3 are one of integer numbers 1 to 3;

Chemical formula 15

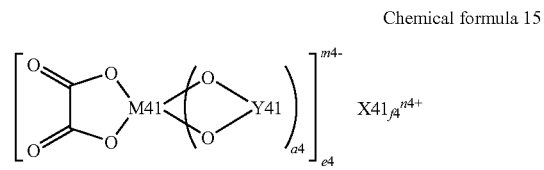

where X41 represents a Group 1A element or a Group 2A element in the short period periodic table, M41 represents a transition metal, a Group 3B element, a Group 4B element, or a Group 5B element in the short period periodic table, Y41 represents —OC—(CR41$_2$)$_{b4}$-CO—, —R43$_2$C—(CR42$_2$)$_{c4}$-CO—, —R43$_2$C—(CR42$_2$)$_{c4}$-CR43$_2$-, —R43$_2$C—(CR42$_2$)$_{c4}$-SO$_2$—, —O$_2$S—(CR42$_2$)$_{d4}$-SO$_2$—, or —OC—(CR42$_2$)$_{d4}$-SO$_2$—, each of R41 and R43 represent a hydrogen group, an alkyl group, a halogen group, or an alkyl halide group, at least one of R41 and R43 represents respectively the halogen group or the alkyl halide group, R42 represents a hydrogen group, an alkyl group, a halogen group, or an alkyl halide group, a4, e4, and n4 are an integer number of 1 or 2, b4 and d4 are one of integer numbers 1 to 4, c4 is one of integer numbers 0 to 4, and f4 and m4 are one of integer numbers 1 to 3; and Chemical formula 16

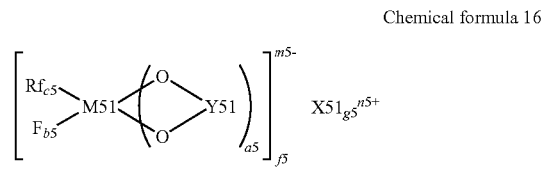

where X51 represents a Group 1A element or a Group 2A element in the short period periodic table, M51 represents a transition metal, a Group 3B element, a Group 4B element, or a Group 5B element in the short period periodic table, Rf represents a fluorinated alkyl group with the carbon number in the range from 1 to 10 or a fluorinated aryl group with the carbon number in the range from 1 to 10, Y51 represents a —OC—$(CR51_2)_{d5}$-CO—, —$R52_2$C—$(CR51_2)_{d5}$-CO—, —$R52_2$C—$(CR51_2)_{d5}$-$CR52_2$-, —$R52_2$C—$(CR51_2)_{d5}$-$SO_2$—, —$O_2$S—$(CR51_2)_{e5}$-$SO_2$—, or —OC—$(CR51_2)_{e5}$-$SO_2$—, R51 represents a hydrogen group, an alkyl group, a halogen group, or an alkyl halide group, R52 represents a hydrogen group, an alkyl group, a halogen group, or an alkyl halide group, and at least one thereof is the halogen group or the alkyl halide group, a5, f5, and n5 are an integer number of 1 or 2, b5, c5, and e5 are one of integer numbers 1 to 4, d5 is one of integer numbers 0 to 4, and g5 and m5 are one of integer numbers 1 to 3.

39. The battery according to claim 38, wherein the compound of Chemical formula 14 is at least one selected from the group consisting of compounds set forth Chemical formula 17, the compound of Chemical formula 15 is at least one selected from the group consisting of compounds set forth in Chemical formula 18, and the compound of Chemical formula 16 is a compound set forth in Chemical formula 19, chemical formulae 17-19 being.

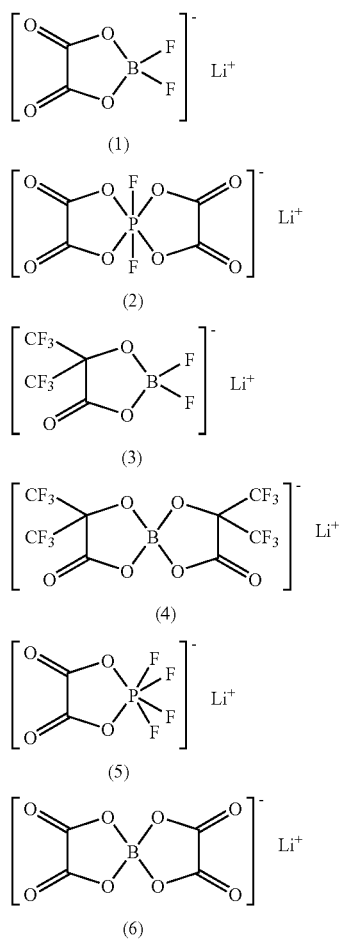

Chemical formula 17

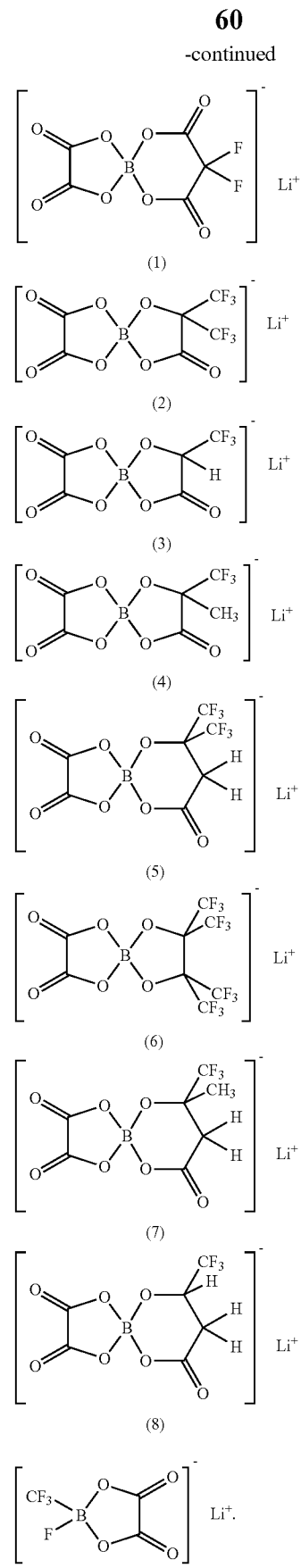

Chemical formula 18

Chemical formula 19

* * * * *